United States Patent [19]

Rourke

[11] Patent Number: 5,384,886
[45] Date of Patent: Jan. 24, 1995

[54] PROCESS FOR ELECTRONICALLY PRINTING ENVELOPES

[75] Inventor: John L. Rourke, Fairport, N.Y.

[73] Assignee: Xerox Corporation, Stamford, Conn.

[21] Appl. No.: 678,913

[22] Filed: Apr. 1, 1991

[51] Int. Cl.$^6$ .................................. G06F 15/62
[52] U.S. Cl. ........................... 395/147; 395/161; 364/464.02
[58] Field of Search ............. 364/464.02, 464.03; 395/115, 117, 147, 148, 149, 161

[56] References Cited

U.S. PATENT DOCUMENTS

| | | | |
|---|---|---|---|
| 4,085,445 | 4/1978 | Blevins et al. | 364/900 |
| 4,345,276 | 8/1982 | Colomb | 358/258 |
| 4,397,542 | 8/1983 | Brodesser | 346/160 |
| 4,542,378 | 9/1985 | Suganuma et al. | 340/734 |
| 4,627,222 | 12/1986 | Cantile | 53/443 |
| 4,680,643 | 7/1987 | Horiguchi | 358/280 |
| 4,800,504 | 1/1989 | Durst Jr. et al. | 364/464.02 |
| 4,800,506 | 1/1989 | Axelrod et al. | 364/464.02 |
| 4,831,554 | 5/1989 | Storace et al. | 364/464.02 |
| 4,853,869 | 8/1989 | Durst, Jr. et al. | 364/464.02 |
| 4,862,386 | 8/1989 | Axelrod et al. | 364/464.02 |
| 4,868,757 | 9/1989 | Gil | 364/464.02 |
| 4,910,686 | 3/1990 | Chang et al. | 364/464.02 |
| 5,059,960 | 10/1991 | Rosenberg et al. | 340/111 |
| 5,122,967 | 6/1992 | Gilham | 364/464.02 |
| 5,173,862 | 12/1992 | Fedirchuk et al. | 364/464.02 |
| 5,208,676 | 5/1993 | Inui | 395/115 |
| 5,257,196 | 10/1993 | Sansone | 364/464.02 |
| 5,272,640 | 12/1993 | Wu | 364/464.02 |

FOREIGN PATENT DOCUMENTS

| | | |
|---|---|---|
| 0088598 | 9/1983 | European Pat. Off. |
| 0335596 | 10/1989 | European Pat. Off. |
| 0376420 | 7/1990 | European Pat. Off. |
| 57-74740 | 1/1982 | Japan |
| 59-103460 | 4/1984 | Japan |
| 60-224375 | 3/1985 | Japan |
| 2160056 | 8/1985 | United Kingdom |

OTHER PUBLICATIONS

Shapiro, N., "the Envelope Please", MacWeek, vol. 4, No. 27 (Aug. 7, 1990) pp. 126–130.
"Macintosh System Software User's Guide Version 6.0", Apple Computers (1988) pp. 8–10.
Bremant, Charles, "The List Is in the Mail", PC Computing, vol. 2 No. 8 (Aug. 1989) p. 44.
Stevens, L., "Mailing List Organizers", MacWorld, vol. 7 No. 3 (Mar. 1990), pp. 205 and 207.
Ting-Jum Fan, et al. "Form Plus: A Form Authoring Tool Kit" The Fourteenth annual International Computer Software and Applications Conference, Oct. 31, 1990, pp. 255–260.
Xenx "Envelope Printers" PC Magazine, Dec. 13, 1988, pp. 221–222.

Primary Examiner—Heather R. Herndon
Assistant Examiner—N. Kenneth Burraston
Attorney, Agent, or Firm—Frederick E. McMullen

[57] ABSTRACT

Process for electronically printing envelopes in which a list of recipient and sender names and addresses are stored in libraries in memory for selective accessing when programming an envelope print job, with programming control to adjust the location of the recipient's address printed on the envelopes, a postage stamp, and programming control to change the postal rate printed with the postage stamp on envelopes.

21 Claims, 20 Drawing Sheets

PROCESS FOR ELECTRONICALLY PRINTING ENVELOPES

The invention relates to electronic printing, and more particularly, to a process for printing envelopes electronically.

Electronic printing employs image signals or pixels as the image source when producing prints. The image signals may be obtained by scanning document originals, from remote sources, by keyboard input, etc. The image signals, following desired processing, are then used by a printer such as a laser or ink jet printer to produce prints on a print media, typically copy sheets.

While copy sheets serve as the usual print media, printing on other media types may in certain print job applications be highly desirable. One such other media type is envelopes, since often the prints produced in a print job are later put in envelopes for delivery to various destinations through the Post Office mails. And, it would be advantageous to provide the ability to print envelopes per se.

Printing envelopes, however, requires a number of specialized abilities, one of which is the ability to print the recepient's and sender's names and addresses in the correct location on the envelopes. In one typical situation, the sender addresses, that is, the names and addresses to whom the envelope and its contents are being mailed to, are not constant during a print run, but change with each envelope printed while the return address is fixed. Another situation is the case where return envelopes are printed for return mailings. In this case, the sender address is the same for each envelope. Other envelope printing situations may, of course, be envisioned.

Further, the ability to also print the postage meter stamp is also desirable to enhance efficiency and avoid the need to later, in a separate operation, apply the postage stamp to each envelope print prior to mailing. And it may be desirable to print bar codes to facilitate postal service destination sorting or for site control.

Since electronic systems have the ability to accept and store image data such as names and addresses in the form of image signals or pixels for printing purposes, as described, for example, in copending U.S. patent application No. 628,130, now U.S. Pat. No. 5,309,558, to John L. Rourke and entitled "Set Addressing For Electronic Printing Machines", the disclosure of which is herein incorporated by reference, systems of this type have an advantage over using a conventional copier system for this purpose. In the copier environment as will be understood, addresses are typically copied onto labels which then are individually attached to the envelopes as by means of adhesive, a relatively slow and expensive process. Electronic systems, on the other hand, have the capability of printing not only names and addresses but postage stamps and other items such as logos, bar codes and the like directly on the envelopes without the use of an intermediate hard copy and the special handling that it requires.

In the prior art, U.S. Pat. No. 4,345,276 to Colomb discloses a method for selectively combining scanned digital images with the digitized data stored within a picture memory to create a single composite image for printing. Further, U.S. Pat. No. 4,542,378 to Suganuma et al discloses a document processing system in which forms are read and stored in memory and thereafter recalled as an electronic overlay into which additional image data is input as the form is filled out, while U.S. Pat. No. 4,680,643 to Horiguchi discloses a process for superimposing a plurality of individual image segments into the divided sections of a common picture plane to form a single composite image. Japanese Patent No. 57-74740 to Sakai discloses a method for forming and printing a composite image by individually selecting and placing the digitized images of various characters and photographs stored in memory files into discrete areas of a print layout displayed on a CRT. Japanese Patent No. 59-103460 to Unemoto discloses a fax system for combining a main message with an address message sent by a second fax transmission wherein part of the main message is cut out and the address message inserted, while Japanese Patent No. 60-224375 to Oota discloses a method for printing a composite image by combining individual image segments in a predefined arrangement. And, U.K. Patent Application No. GB 2,160,056A to Hirosawa et al, discloses a cut and paste method for creating a composite image in which individual image segments are combined in a predefined arrangement.

In contrast, the present invention provides a method for processing envelopes in an electronic printing system having a printer for making prints on print media such as envelopes from image signals, memory means for storing the image signals for use by the printer in making prints, programming means including an interactive screen for programming the system to produce prints, a source of envelope print media, and envelope print media feeding means for feeding print media in succession to the printer for printing, comprising the steps of: displaying an envelope job ticket on the interactive screen having preselected default envelope programming selections including a preselected default sender address programming selection and a preselected default return address programming selection for programming an envelope printing job; providing a sender address directory in the memory having plural sender address files containing discrete sender addresses for programming selection; providing at least one return address file having plural return addresses for programming selection; accessing the sender address directory in the memory to display on the interactive screen the sender address files; visually identifying the preselected default sender address file on the interactive screen; using the interactive screen, selecting a new sender address file from the sender address files and visually identifying the new sender address file programming selection on the interactive screen in place of the default sender address file programming selection in response to selection of the new sender address file.

The invention further provides, in an electronic printing system having a printer for making prints on envelopes, memory means for storing image signals for use by the printer in making prints on the envelopes, a supply of envelopes, and feeding means for feeding envelopes in succession to the printer for printing, the combination of: a sender address directory in the memory having plural sender address subdirectories, each of the sender address subdirectories having plural sender addresses for printing on the envelopes by the printer; a return address directory stored in the memory having plural return addresses for printing on the envelopes by the printer; programming means for selecting one of the sender address subdirectories from the sender address directory and one of the return addresses from the return address subdirectory for printing on the envelopes;

and control means for setting the number of envelopes printed equal to the number of sender addresses in the one sender address subdirectory.

IN THE DRAWINGS

Figure 5A:
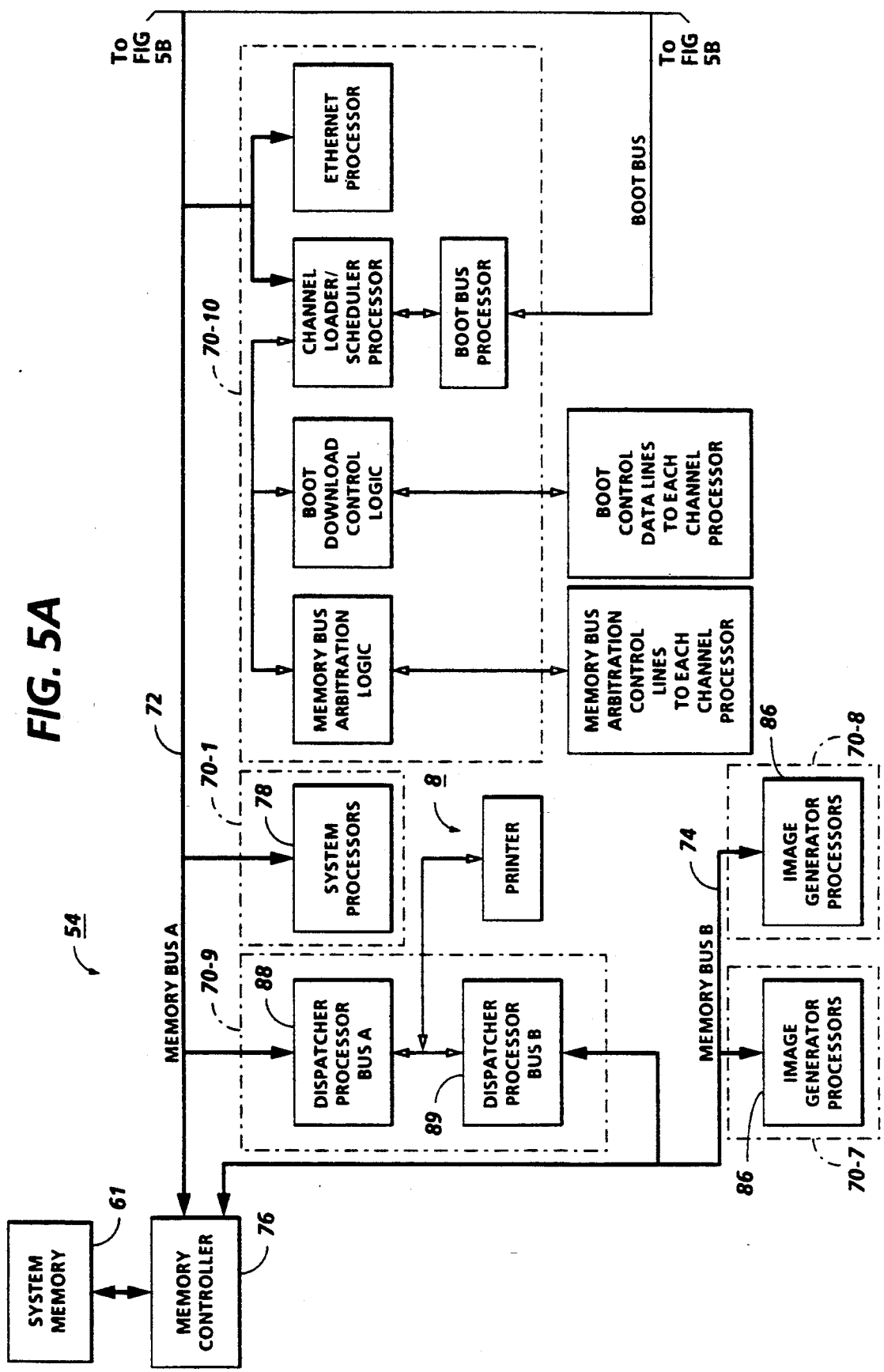
Figure 5B:
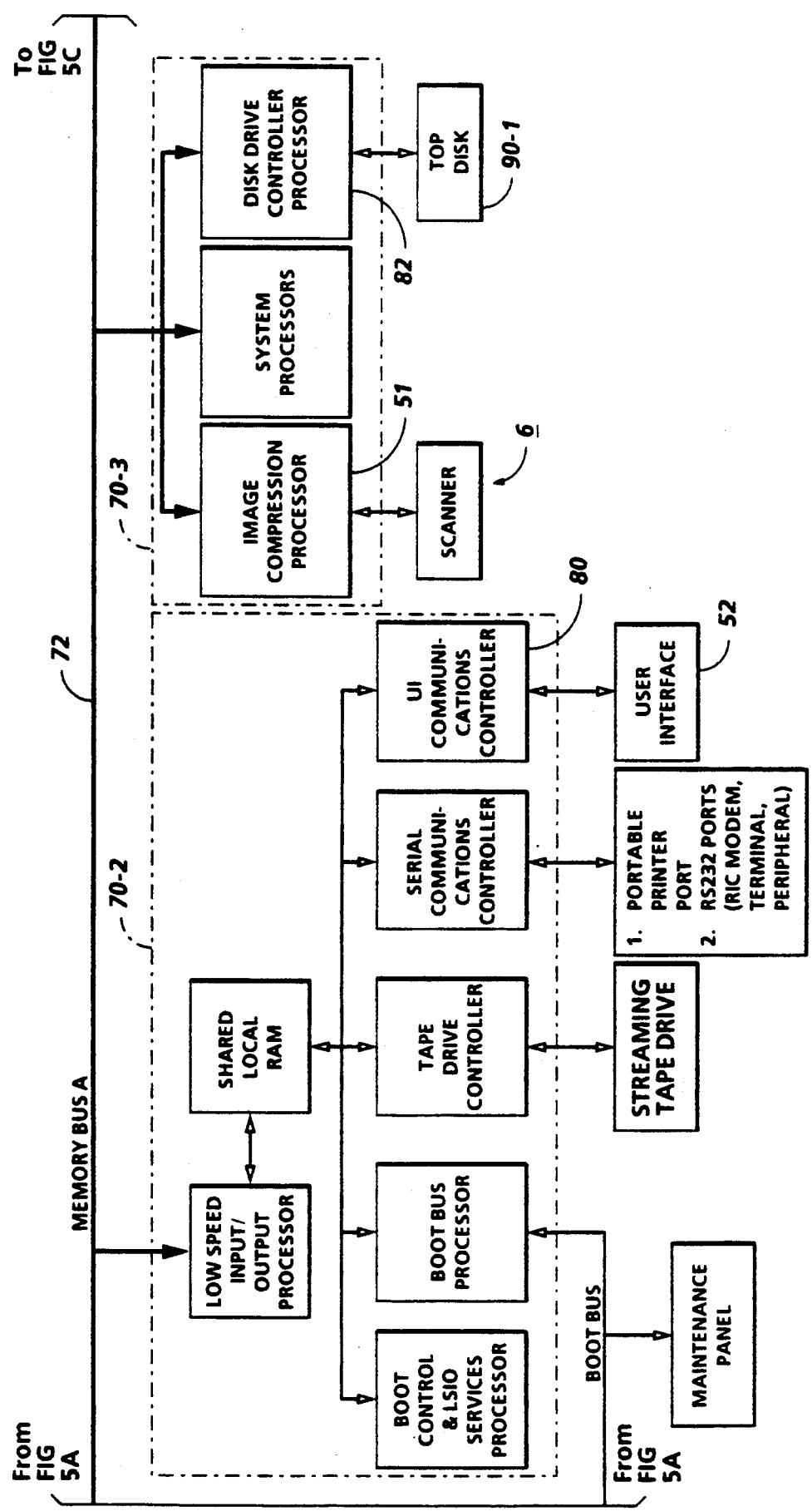
Figure 5C:
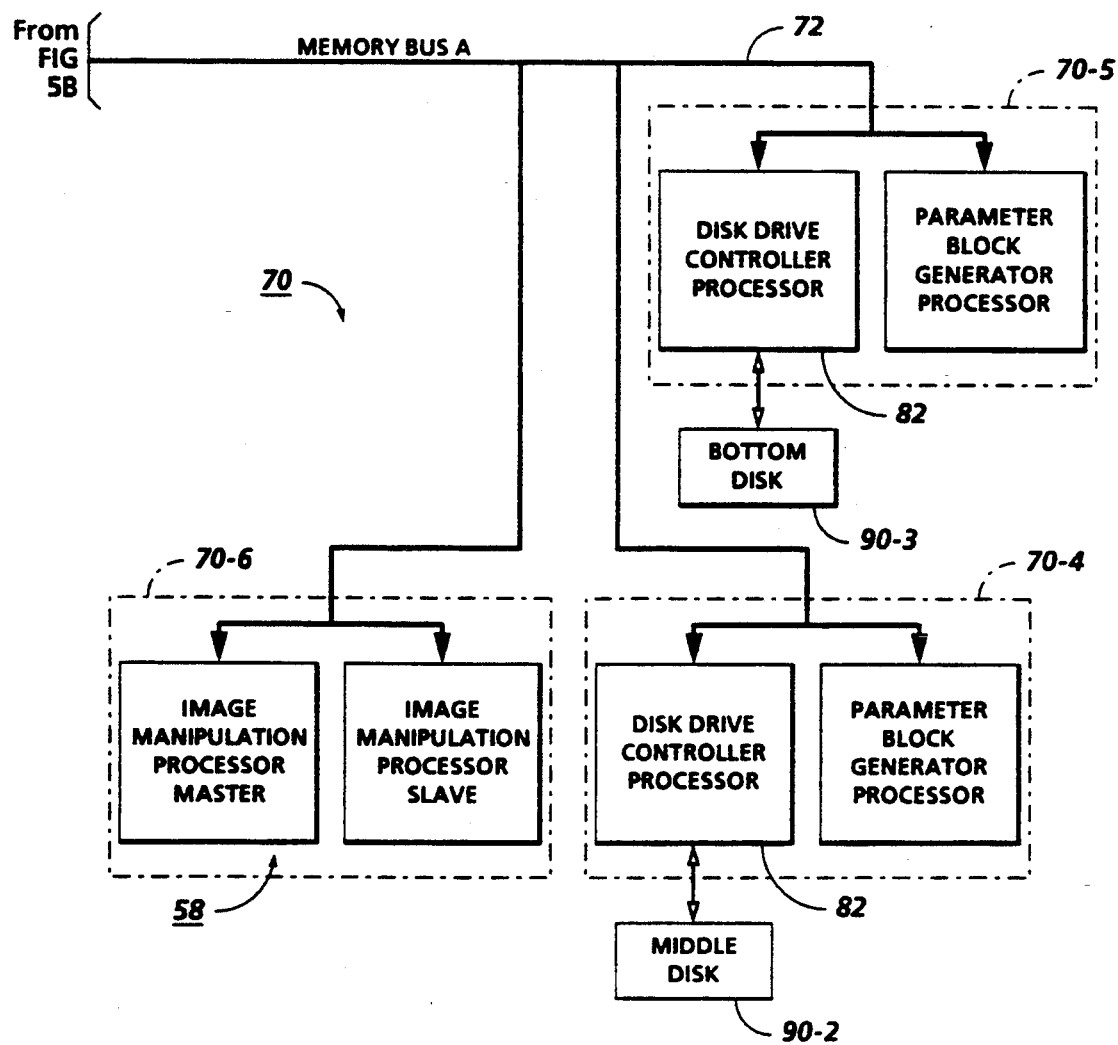
Figure 6:
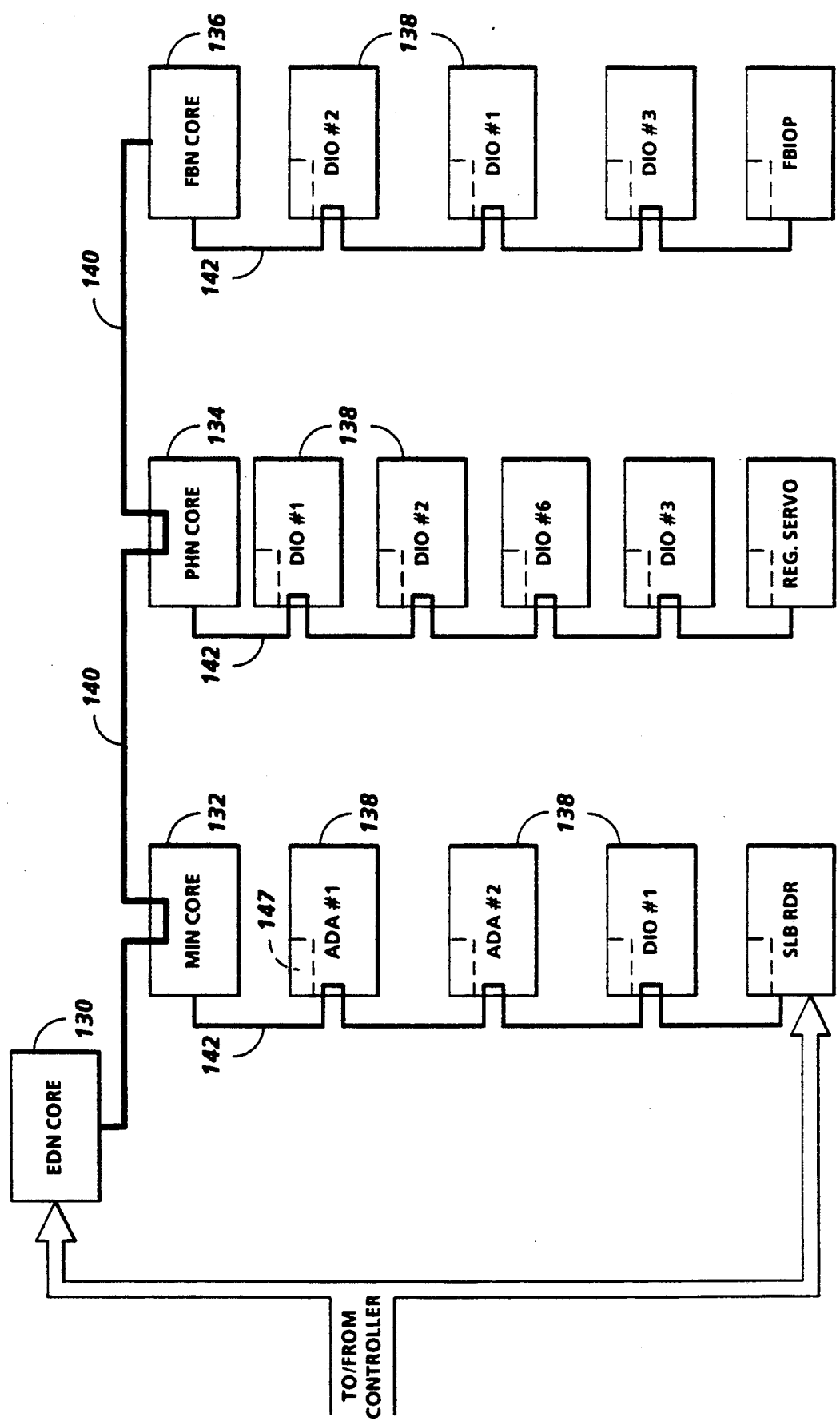
Figure 7:
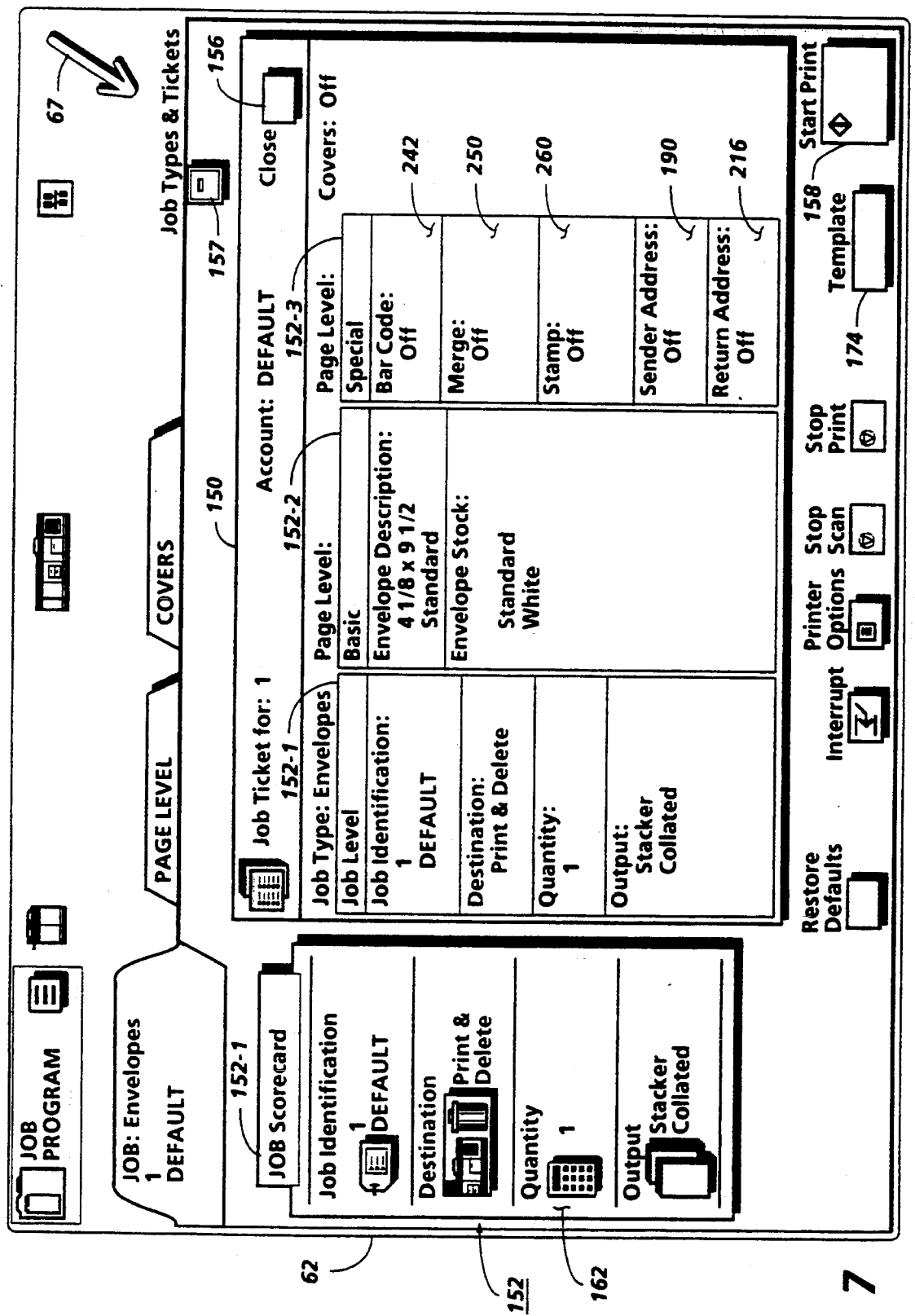
Figure 8:
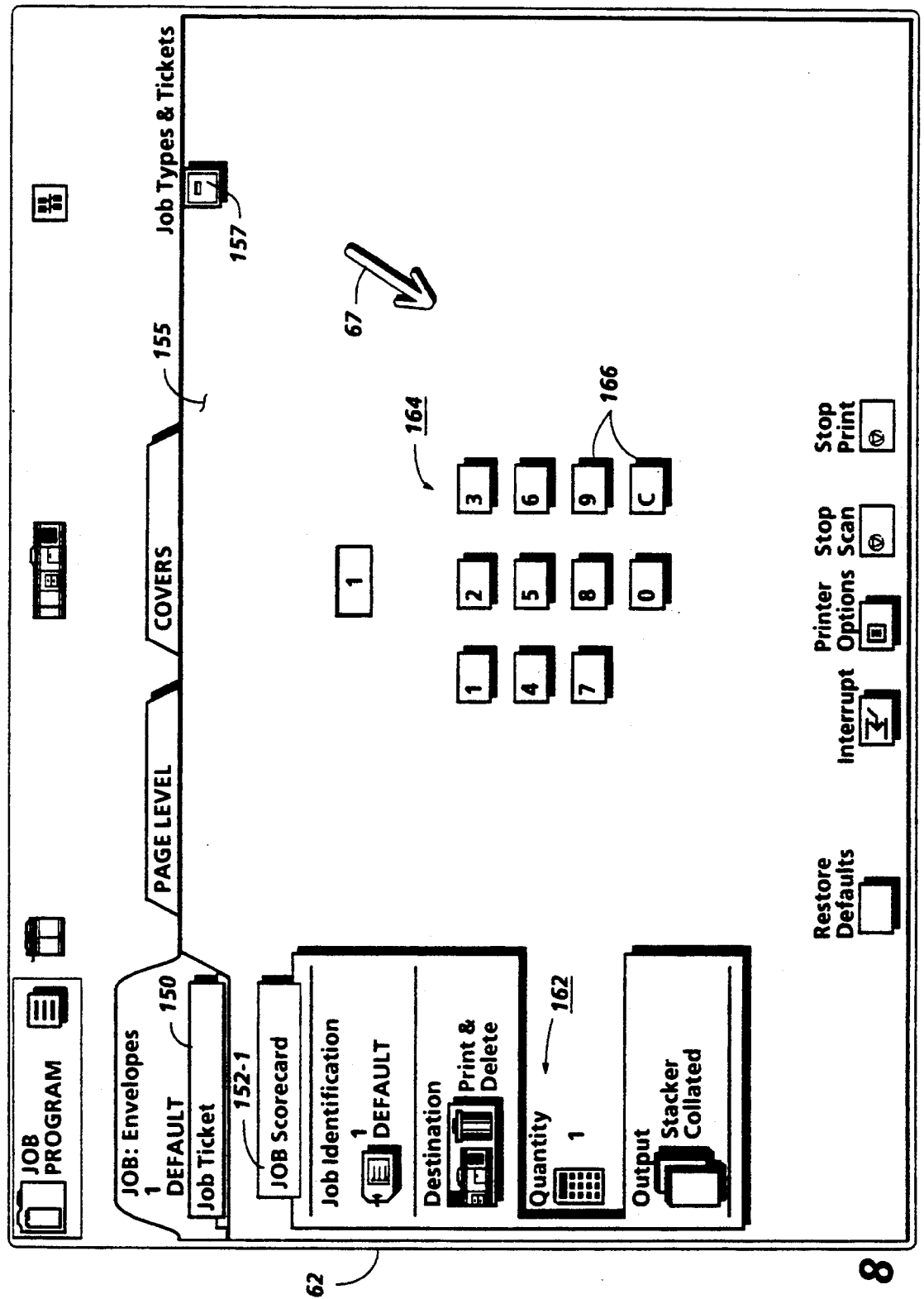
Figure 9:
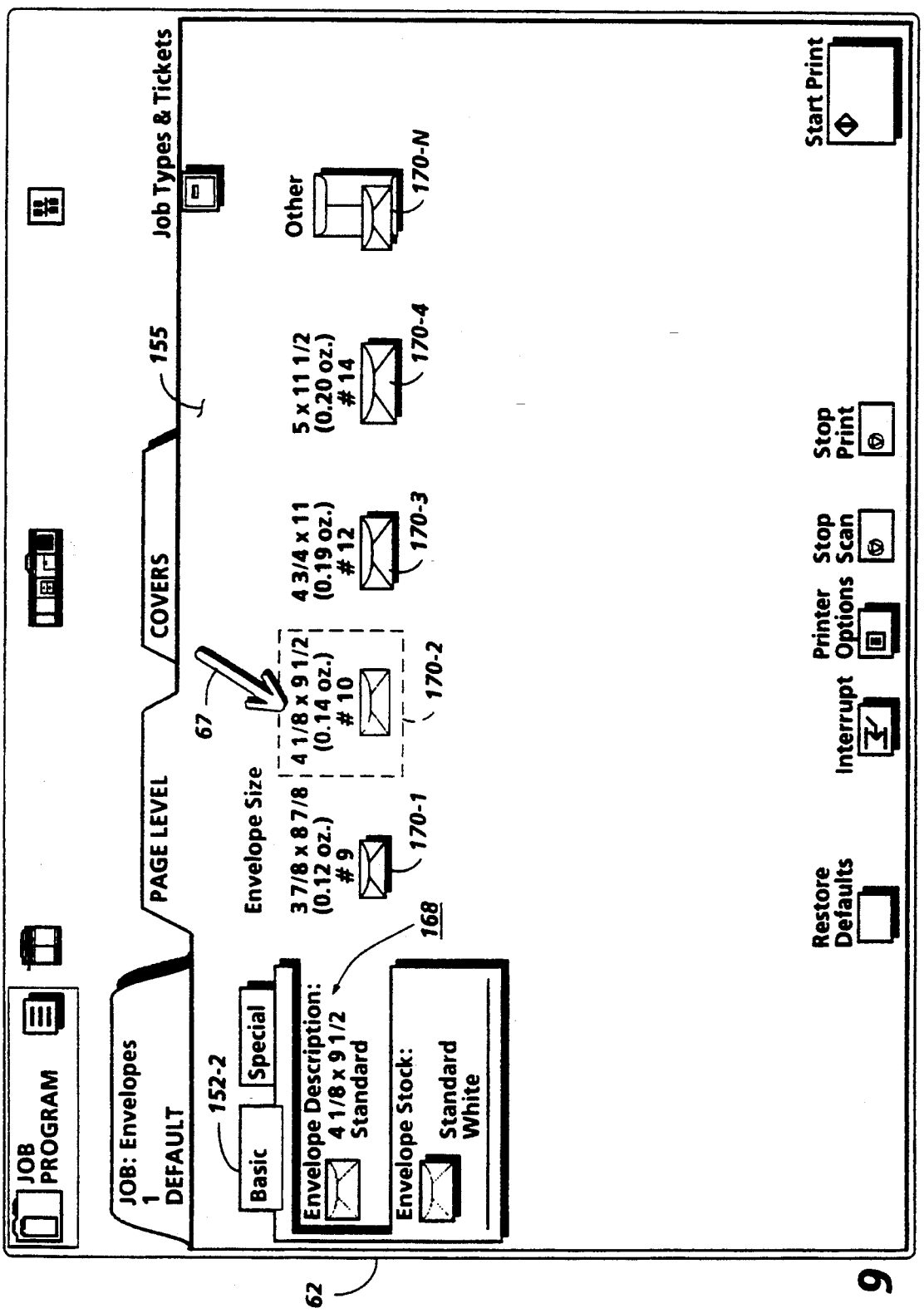
Figure 10:
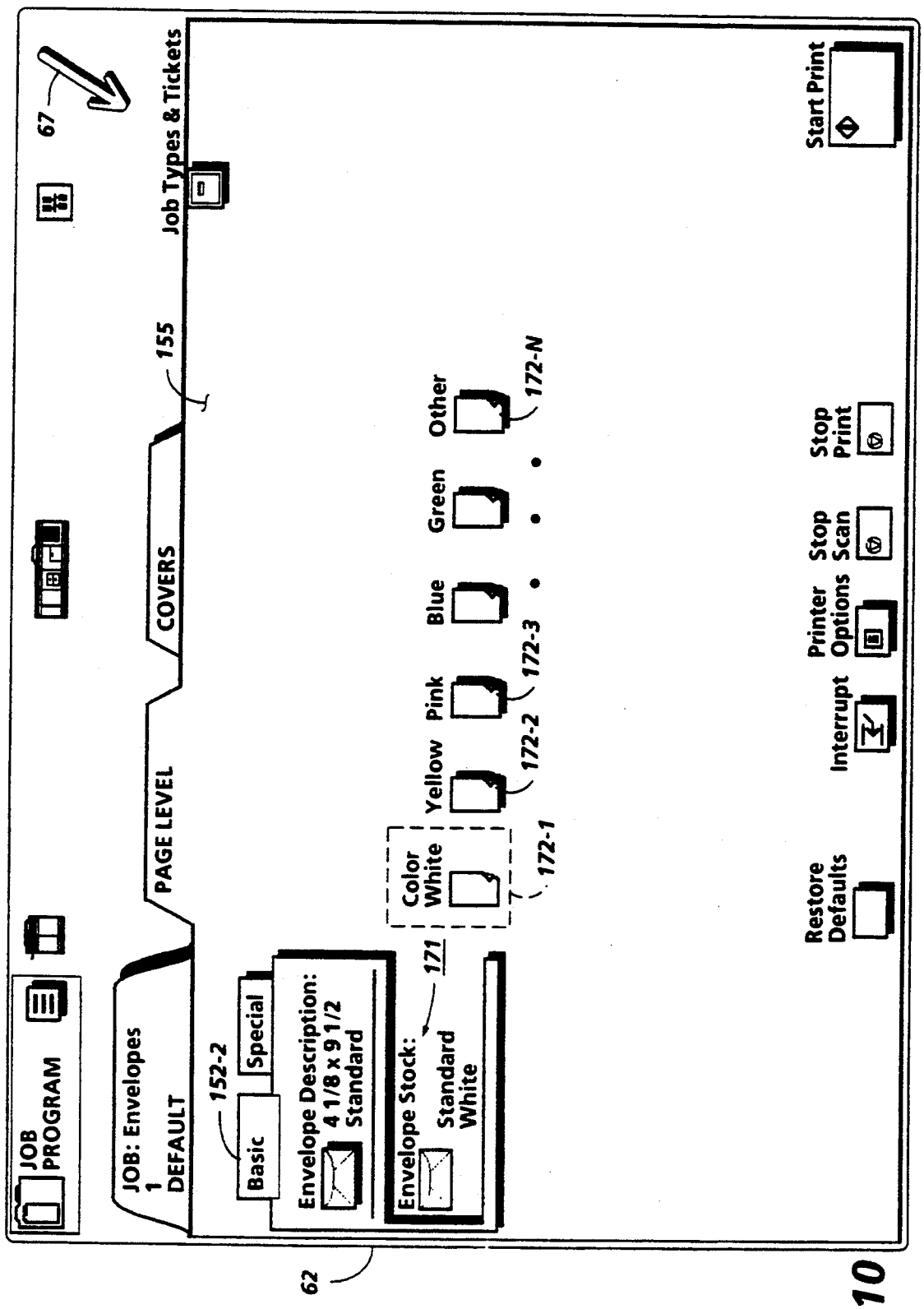
Figure 11:
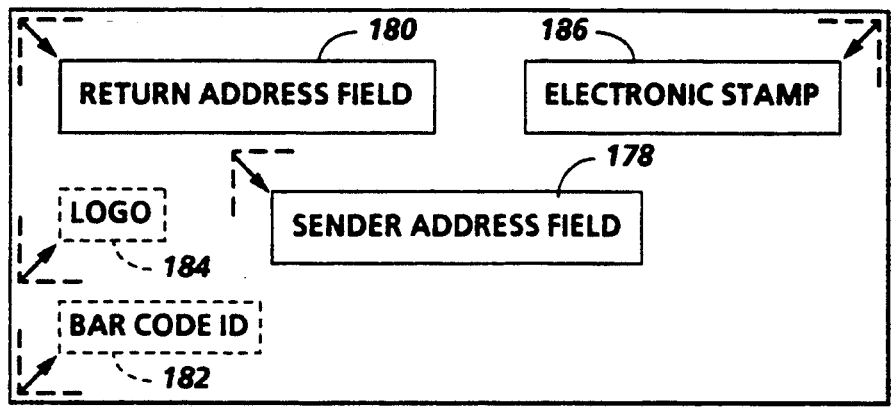
Figure 11:
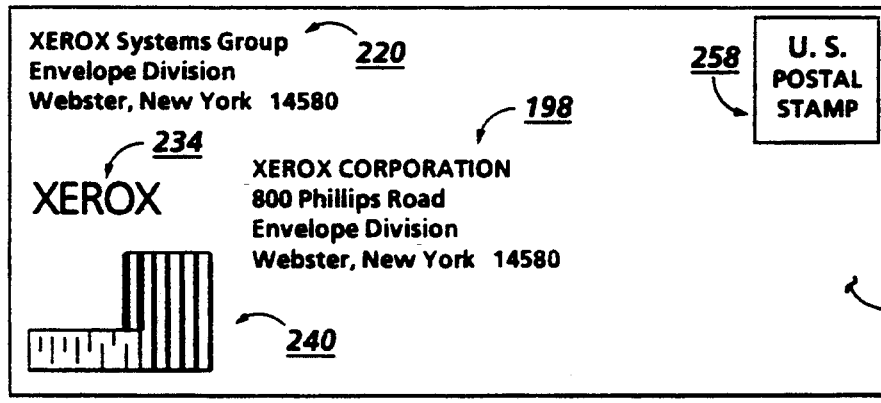
Figure 12:
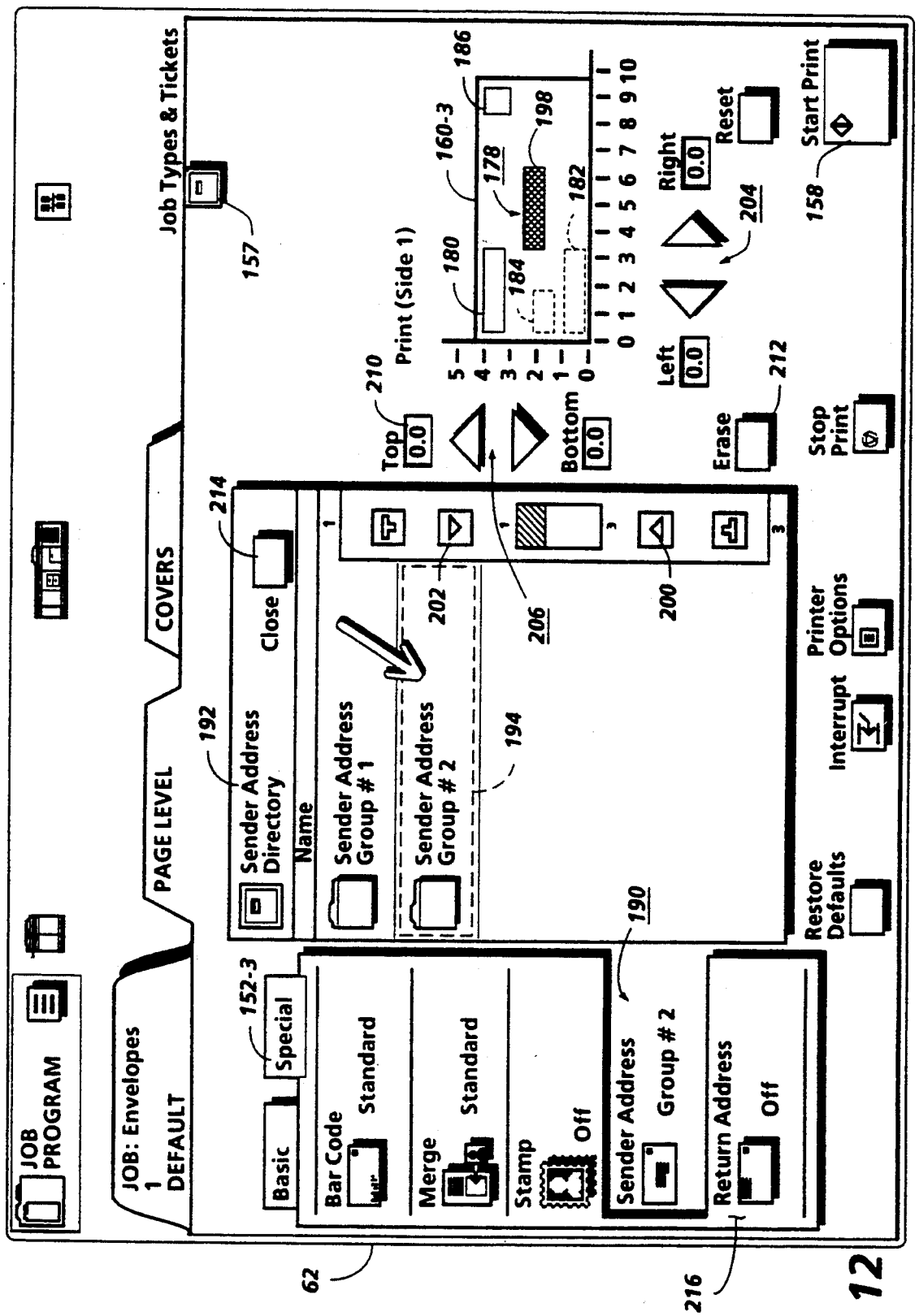
Figure 13:
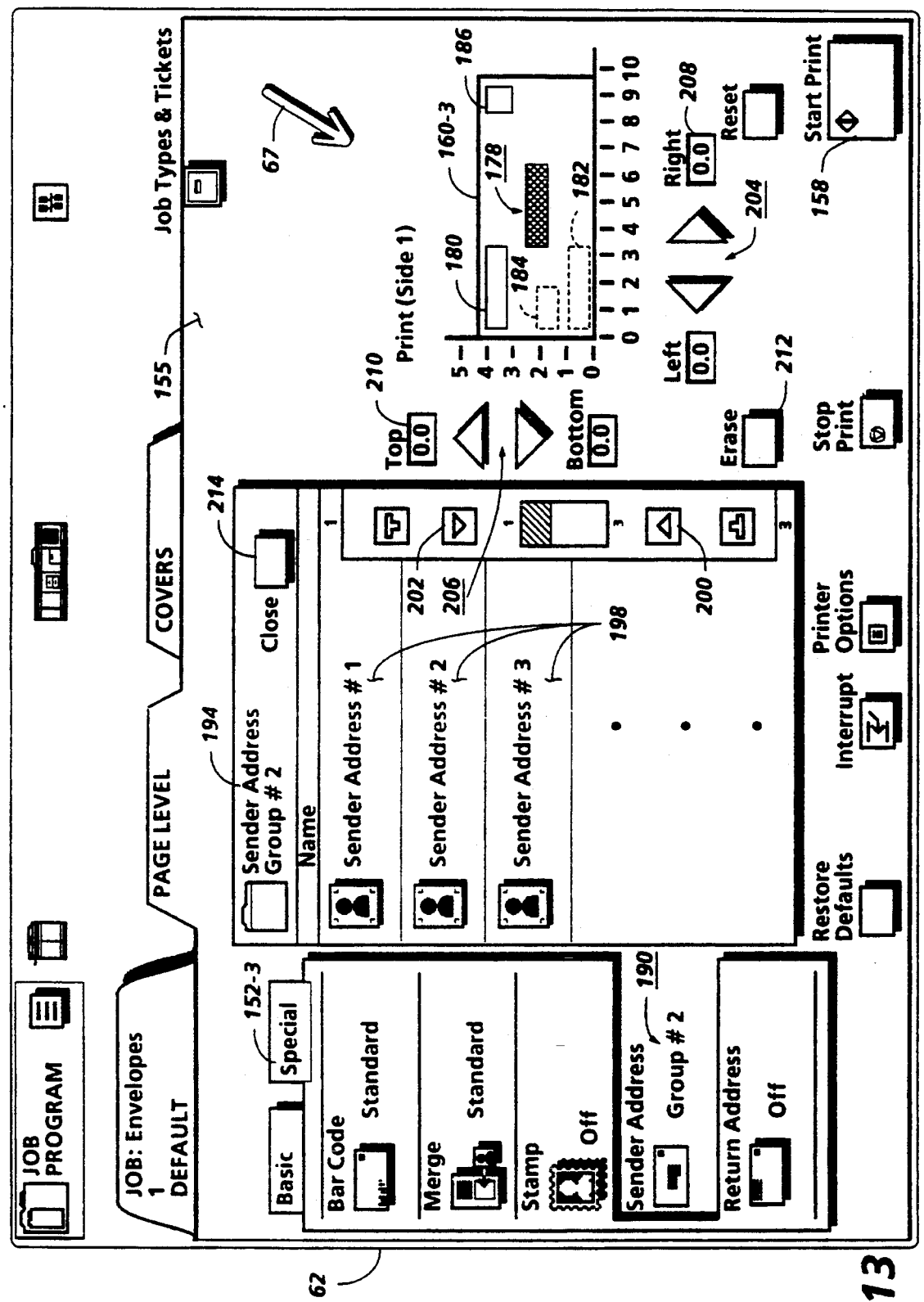
Figure 14:
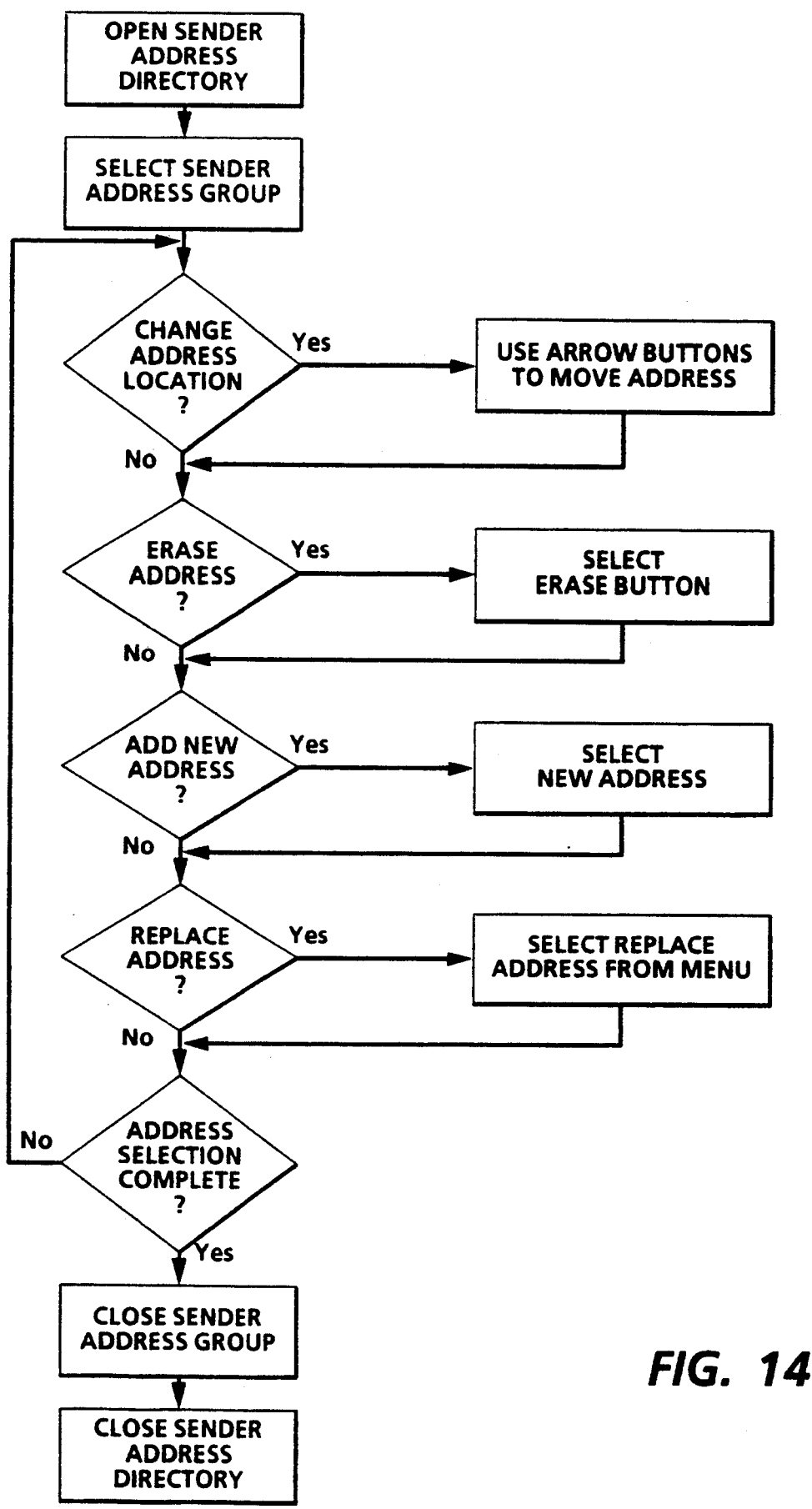
Figure 15:
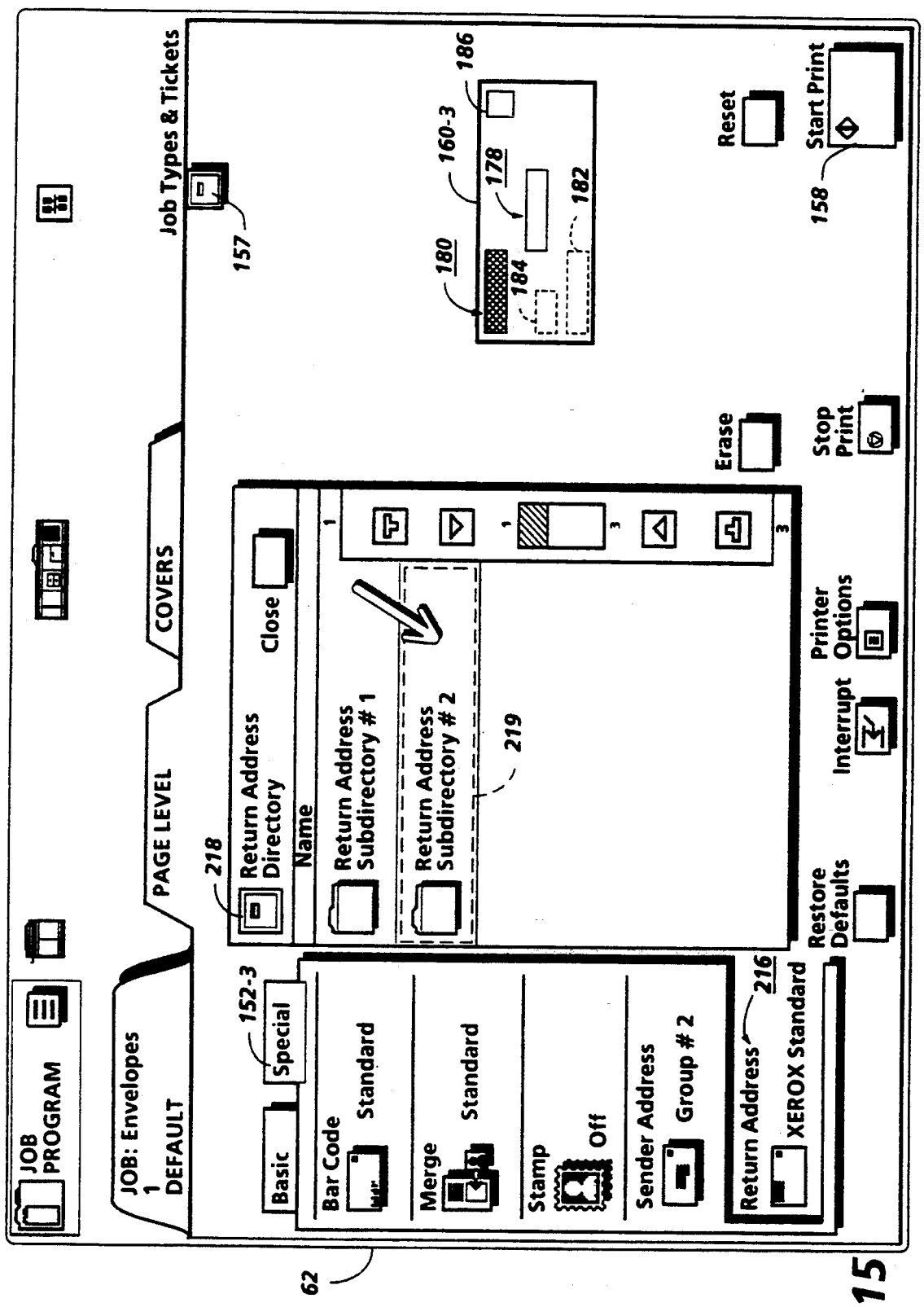
Figure 16:
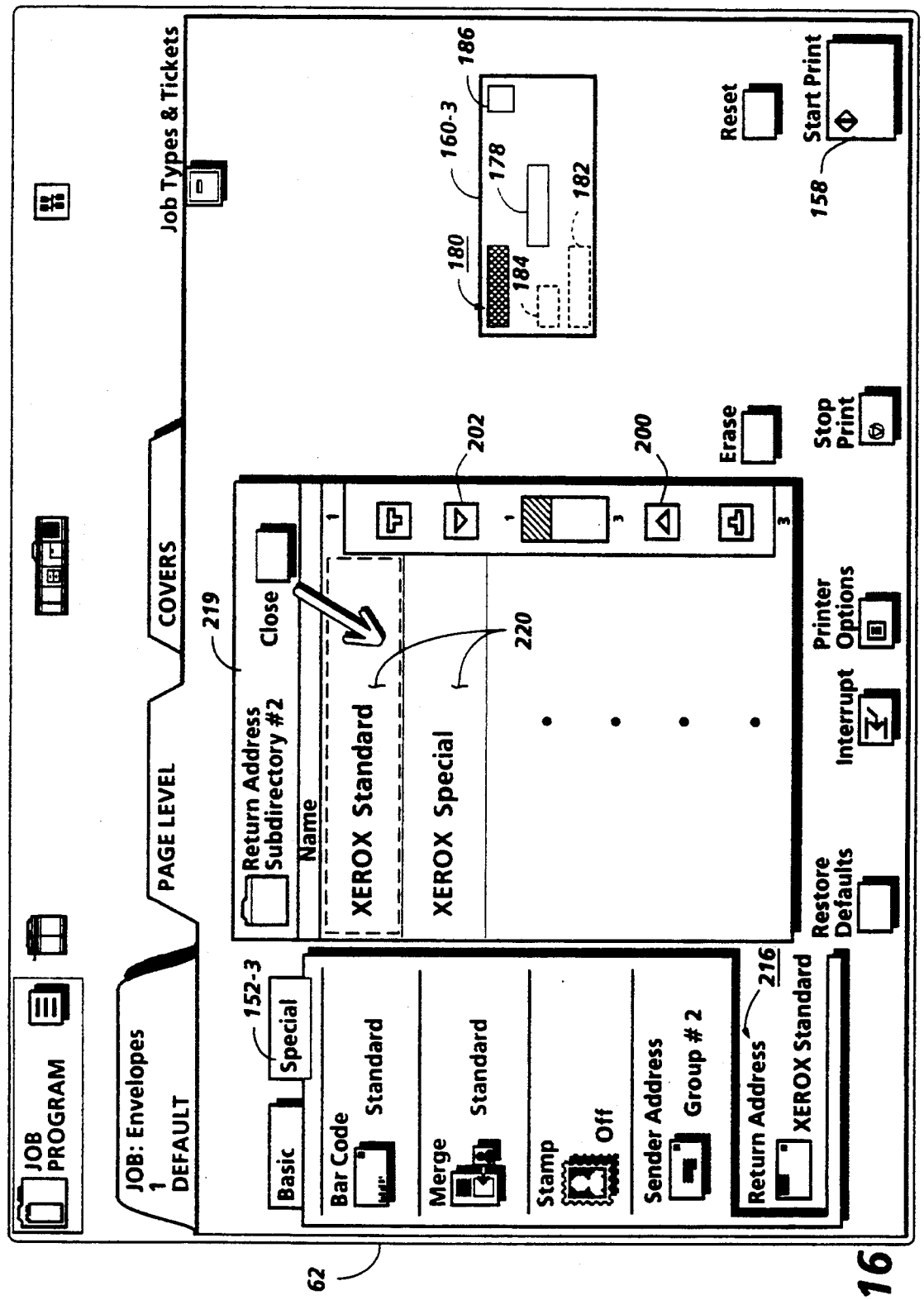
Figure 17:
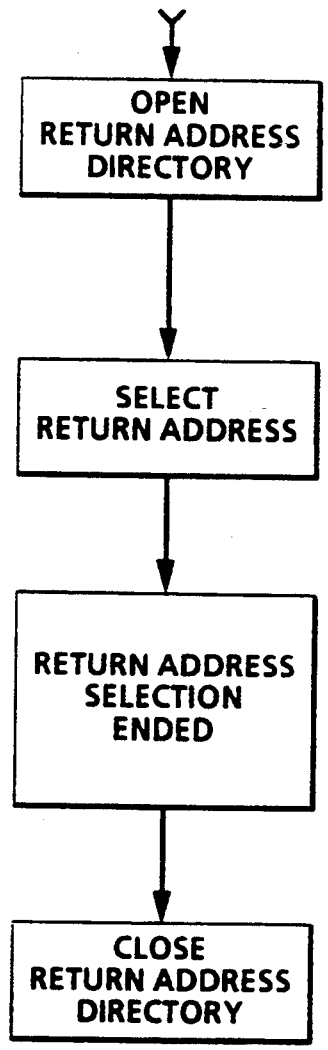
Figure 18:
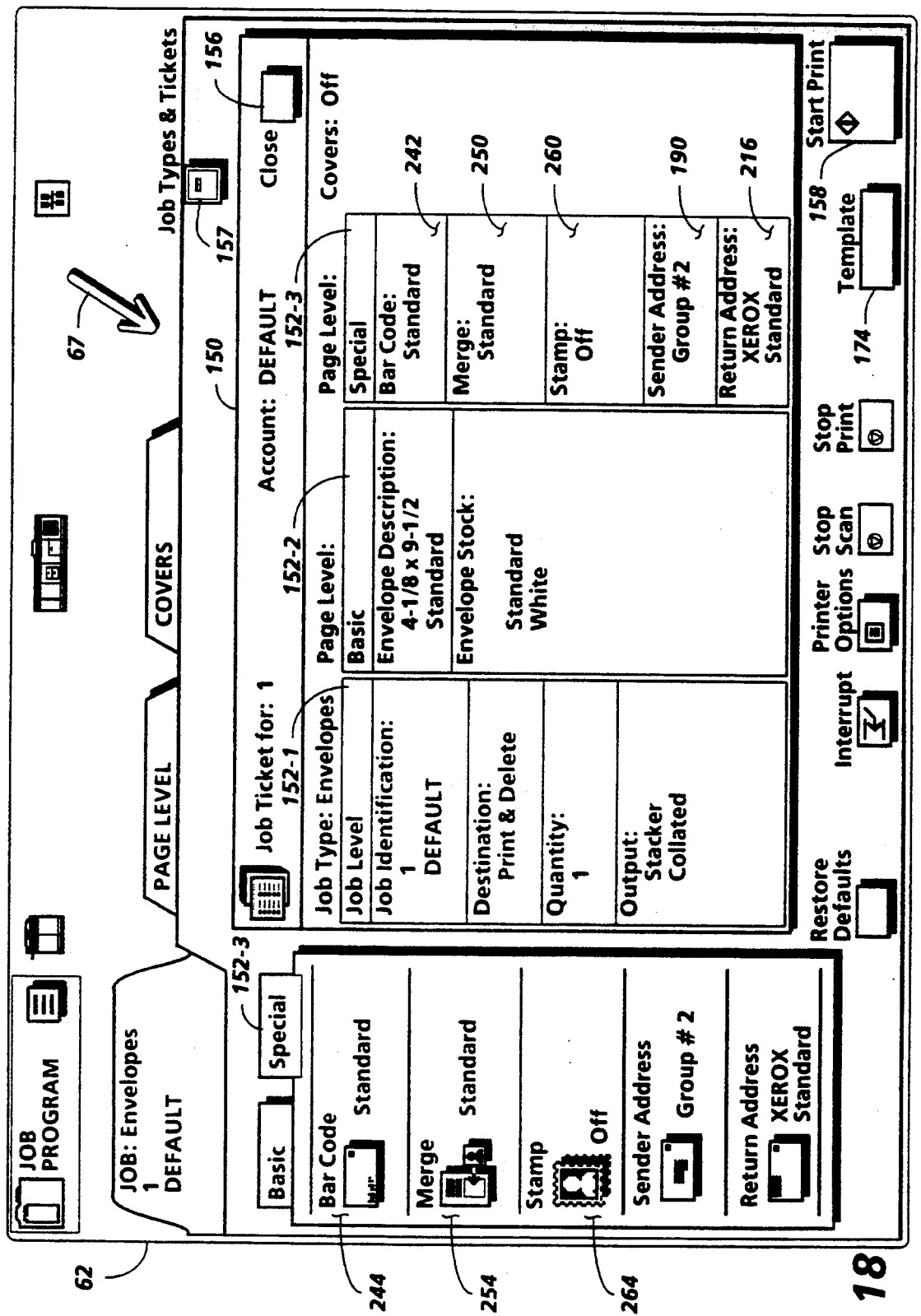

FIGS. 5A, 5B and 5C comprise a schematic block diagram showing the major parts of the system control section;

FIG. 6 is a block diagram depicting the Operating System, with Printed Wiring Boards and shared line connections;

FIG. 7 is a view of the User Interface touchscreen display in the Job Programming mode displaying an example of a Job Ticket and Job Scorecard used for programming envelope printing jobs;

FIG. 8 is a view of the touchscreen display depicting the programming selections for programming the number of envelopes or sets of envelopes to be printed;

FIG. 9 is a view depicting various envelope size programming choices for selection when programming an envelope printing job;

FIG. 10 is a view depicting various envelope stock programming choices for selection when programming an envelope printing job;

FIG. 11 is a view depicting an envelope mimic with sender address, return address, bar code, logo, and stamp fields together with a sample envelope print to facilitate programming of an envelope printing job;

FIG. 12 is a view of the touchscreen display depicting the programming selections following accessing of the Sender Address Directory showing various Sender Address Groups available for selection with the current Sender Address selection highlighted;

FIG. 13 is a view of the touchscreen display depicting sender addresses contained in a Sender Address Group following opening of the Sender Address Group highlighted in FIG. 12;

FIG. 14 is a flow chart depicting the process for programming sender addresses for printing on envelopes;

FIG. 15 is a view of the touchscreen display depicting the programming selections following accessing of a Return Address Directory showing Return Address Subdirectories contained in the Return Address Directory with the Return Address Subdirectory having the return address currently programmed highlighted;

FIG. 16 is a view of the touchscreen display depicting the return addresses in the Return Address Subdirectory highlighted in FIG. 15, with the return address currently selected for printing highlighted;

FIG. 17 is a flow chart depicting the process for programming the return address for printing on envelopes; and FIG. 18 is a view of the Job Ticket shown in FIG. 7 following programming changes to the default settings of the Special scorecard.

Figure 1:
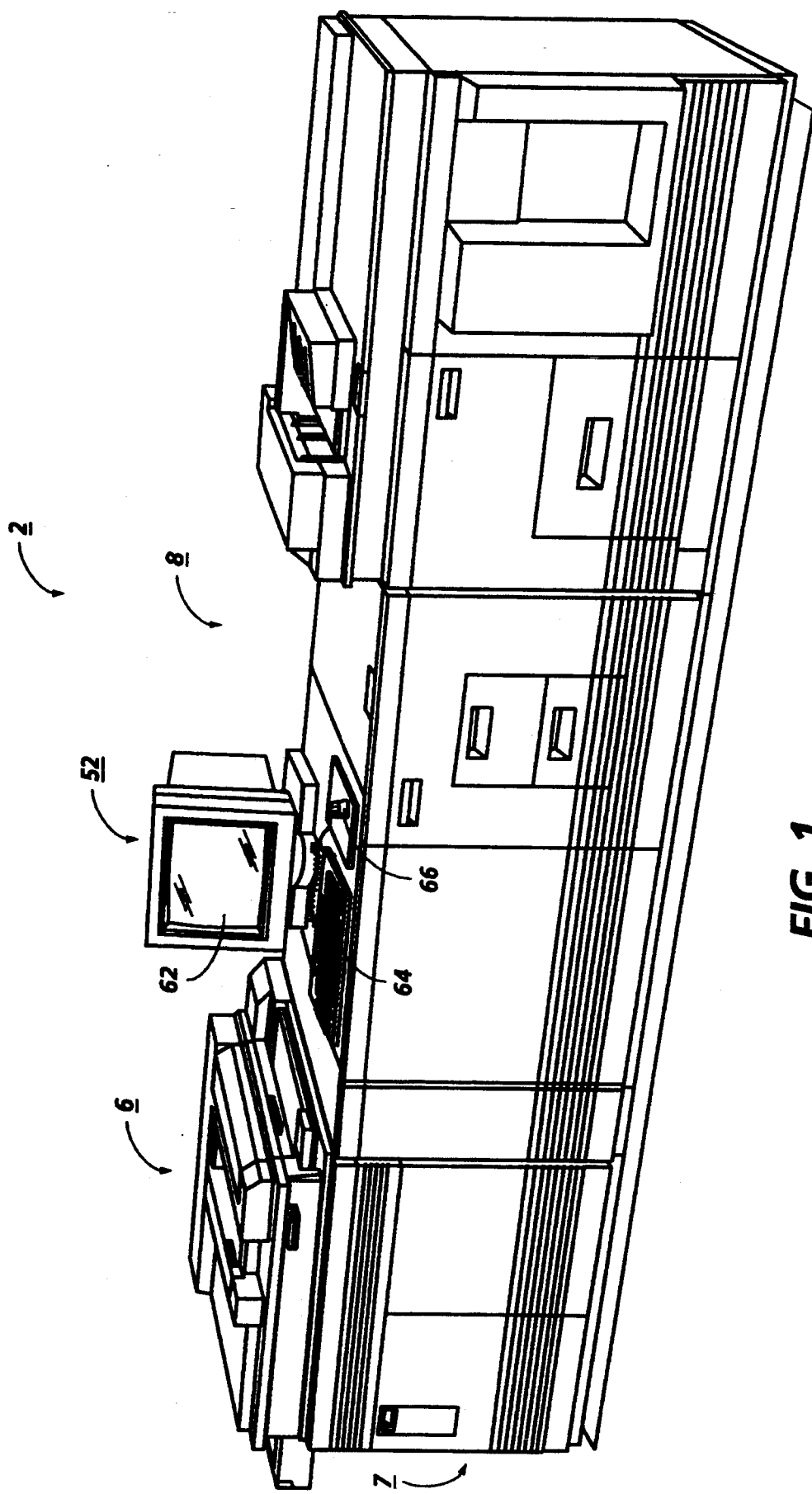
FIG. 1 is a view depicting an exemplary electronic printing system for processing and printing envelopes in accordance with the teachings of the present invention.
Figure 2:
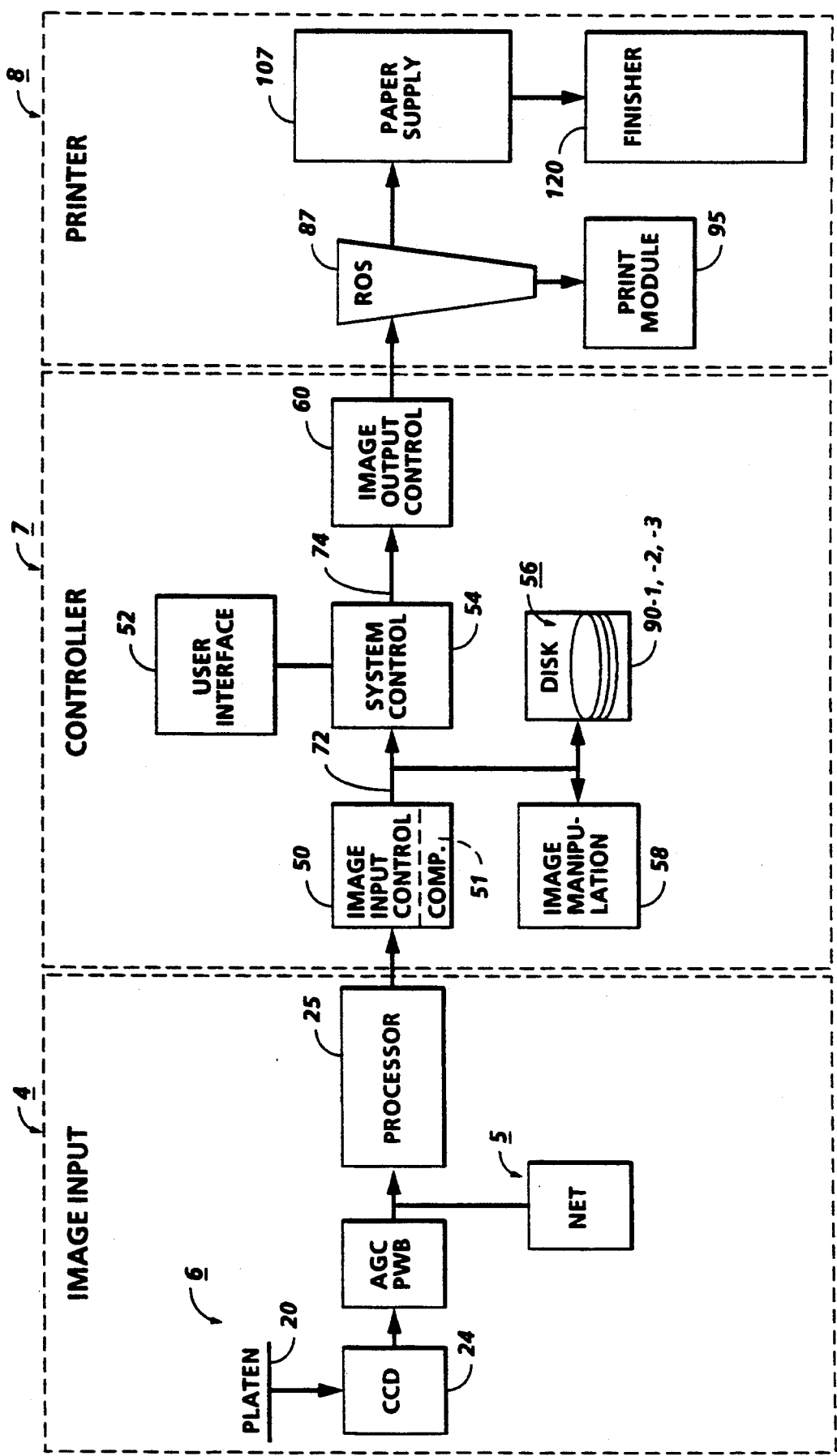
FIG. 2 is a block diagram depicting the major elements of the printing system shown in FIG. 1.

Referring to FIGS. 1 and 2, there is shown an exemplary image printing system 2 for processing envelope print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer, etc. While a specific printing system is shown and described, the present invention may be used with other types of printing systems. For example, printer section 8 may instead use a different printer type such as ink jet, ionographic, etc.

Figure 3:
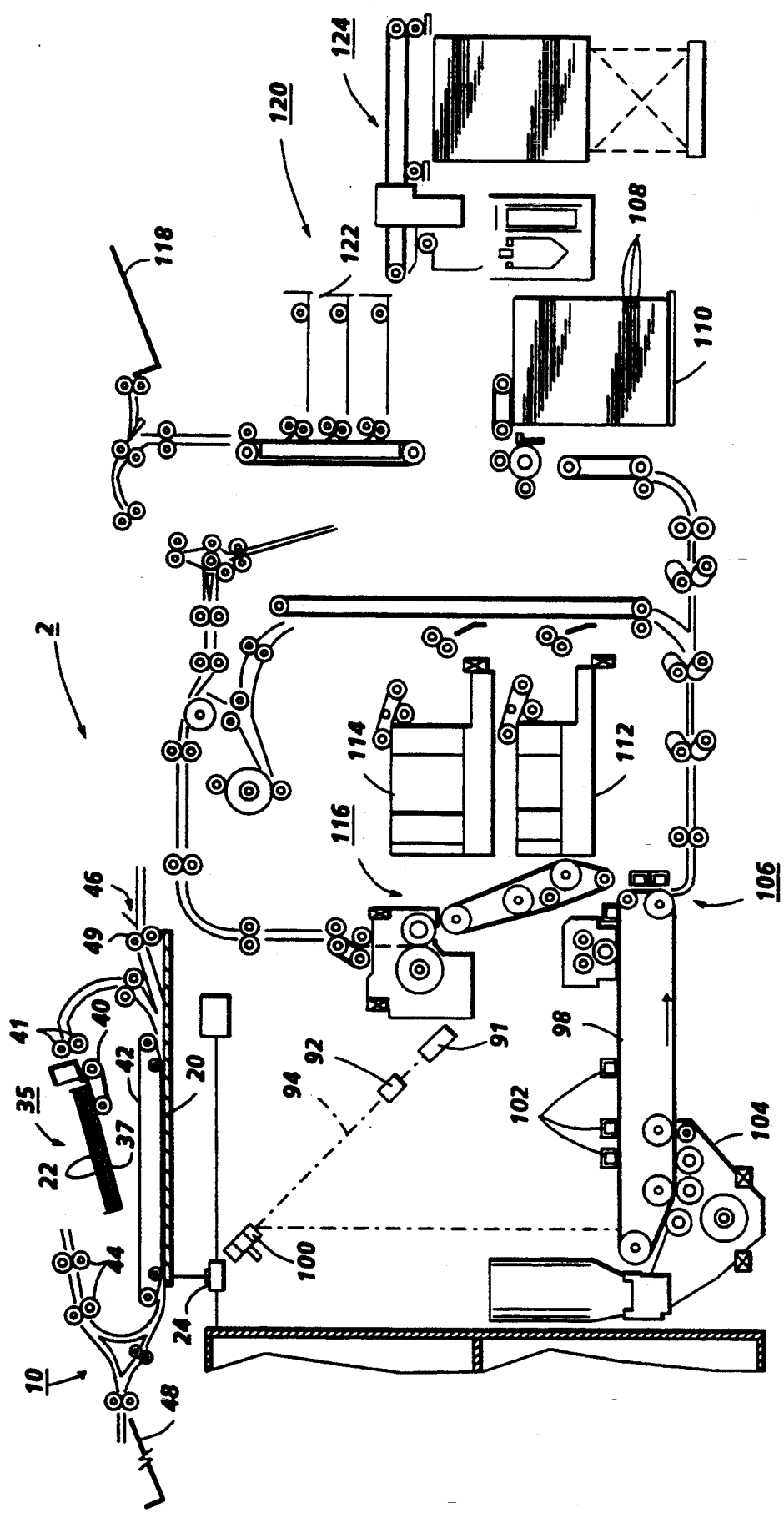
FIG. 3 is a plan view illustrating the principal mechanical components of the printing system shown in FIG. 1.
Figure 4:
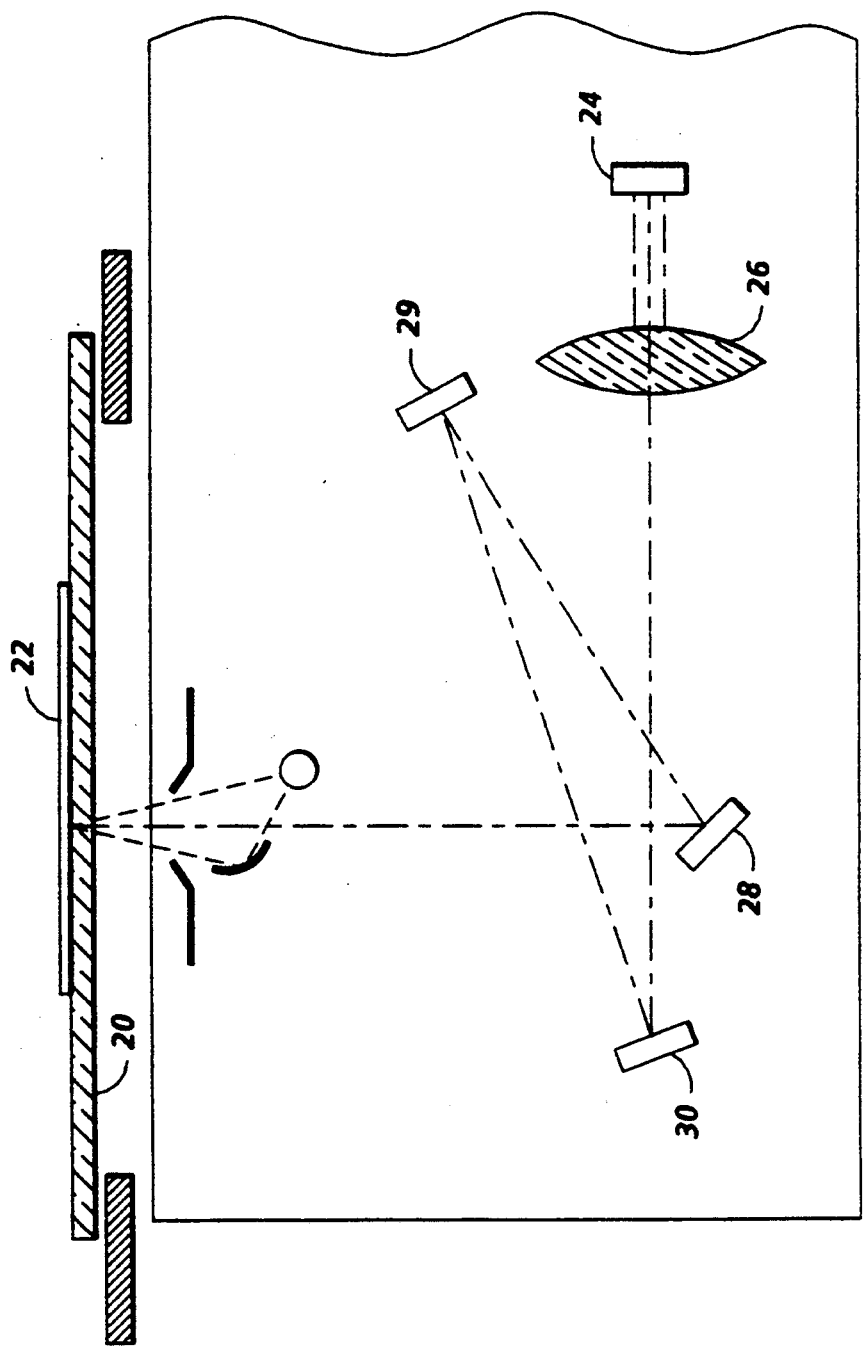
FIG. 4 is a schematic view showing certain construction details of the document scanner.

Referring particularly to FIGS. 2–4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 1, 2 and 5, controller section 7 includes image input control 50, User Interface (UI) 52, system control 54, main memory 56, image manipulation section 58, and image output control 60. Image data from processor 25 of image input section 4 is input to image input control 50 where the data is compressed and temporarily stored in Random Access Memory (RAM) 26 pending transfer to main memory 56 where the data is held pending use.

As seen in FIGS. 5A and 5B, control section 7 has a plurality of Printed Wiring Boards (PWBs) 70 coupled with one another and with RAM 26 by memory buses 72, 74. Memory controller 76 couples RAM 26 with buses 72, 74. PWBs 70 include system processor PWB 70-1 having plural system processors 78; low speed I/O processor PWB 70-2 with UI communication controller 80 for transmitting data to and from UI 52; PWBs 70-3, 70-4, 70-5, with disk drive controller/processors 82 for transmitting data to and from disks 90-1, 90-2, 90-3 respectively of main memory 56, with PWB 70-3 having image compressor/processor 51 for compressing the image data; image manipulation PWB 70-6 with image manipulation processor 85; and image generation processor PWBs 70-7, 70-8 with image generation processors 86 for processing the image data for output to printer section 8 and dispatch processor PWB 70-9 for controlling transmission of data via dispatch processors 88, 89 to and from printer section 8.

UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 26 such as files and icons are actuated by either touching the displayed item on screen 26 with a finger or by using mouse 66 to move a cursor 67 to point the cursor to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps selected such as collation, make ready, decomposition, etc. are carried out. Following processing, the data may be returned to main memory 56, sent to UI 52 for display on touchscreen 62, or sent to image output control 60.

Image data output to image output control 60 is decompressed and readied for printing by image generating processors 86 of PWBs 70-7, 70-8. Following this, the data is output by dispatch processors 88, 89 of PWB 70-9 to printer section 8. Image data sent to printer section 8 for printing is normally purged from memory 56 to make room for new image data.

Referring to FIGS. 2 and 3, printer section 8 has a laser printer with a laser 91 modulated in accordance with the content of an image signal input by acousto-optic modulator 92 to provide imaging beam 94. Beam 94 is scanned across a moving photoreceptor 98 in the form of a belt by the mirrored facets of a rotating polygon 100 to imagewise expose photoreceptor 98 and create the latent electrostatic images represented by the image signal input to beam modulator 92. Photoreceptor 98 is uniformly charged by corotrons 102 at a charging station preparatory to exposure by imaging beam 94. The latent electrostatic images are developed by developer 104 and transferred at transfer station 106 to a sheet 108 of print media such as envelopes 160 (envelopes 160 are shown in FIG. 11), cards, post cards, etc. brought forward in timed registration therewith from either main paper tray 110 or from auxiliary paper tray 112, or 114. The developed image on sheet 108 is permanently fixed or fused by fuser 116, the resulting prints being discharged to output tray 118, or alternately to finisher 120. Finisher 120 includes a stitcher 122 for stitching or stapling the prints together to form books and a thermal binder 124 for adhesively binding the prints into books.

Referring particularly to FIG. 6, a plurality of printed wiring boards (PWBs) including EDN core PWB 130, a Marking Imaging core PWB 132, a Paper Handling core PWB 134, and a Finisher Binder core PWB 136 together with various Input/Output (I/O) PWBs 138 are provided. A system bus 140 couples the core PWBs 130, 132, 134, 136 with each other and with memory 56 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152-1, 152-2, 152-3 associated with it so that on activation of a particular job level or of a specific icon, the appropriate Scorecard is displayed on touchscreen 62.

As described print jobs may be derived from multiple sources, i.e., jobs scanned in using scanner 6 for printing; jobs scanned in, stored, and then edited or added to for printing later; jobs remotely scanned in and submitted to the system as for example through net 5; jobs remotely developed and then submitted to the system for printing, etc.

As described herein, programming selections are made by touching the iconic programming representation displayed on touchscreen 62 or by using mouse 66 to point cursor 67 at the desired iconic representation and keying the mouse. These actions may be referred to herein as actuating, highlighting, touching, etc.

ENVELOPE DESCRIPTION

Referring to FIG. 11, an envelope of the type printed by printing system 2 is shown. As will appear, the envelope 160 of FIG. 11 comprises a sample envelope template 160-2 that may be displayed on screen 62 to assist the user in programming an envelope printing job.

Referring now to FIGS. 7 and 8, to program system 2 to process envelopes 160, "Job Types & Tickets" icon 157 is actuated to display a "Job Envelopes" ticket 150 having Job Level, Basic, and Special scorecards 152-1, 152-2, 152-3 respectively, with Job Level scorecard 152-1 displayed. Preselected default envelope programming selections or settings are provided. Job Level scorecard 152-1 enables the default programming settings for "Job Identification", "Destination", "Quantity", and "Output" programming selections to be changed. For example and as will appear more fully later, where it is desired to change the number of envelopes or sets of envelopes 160 printed from the default setting of "1", "Quantity" selection 162 is touched which as shown in FIG. 8 displays a keyboard 164. By touching selected keys 166 of keyboard 164, a new quantity is programmed. Changes to the default programming settings of "Job Identification", "Destination" and "Output" are similarly programmed.

Referring to FIGS. 7 and 9, basic scorecard 152-2 enables the envelope size and/or stock default programming settings to be changed. Presuming that it is desired to change the envelope size default setting, Basic scorecard 152-2 is highlighted to cause the Basic scorecard to be displayed on the left side of screen 62 in place of Job Level scorecard 152-1. Touching "Envelope Description" selection 168 of Basic scorecard 152-2 displays in work area 155 of screen 62 various pre-established envelope size selection icons 170-1, 170-2, 170-3, 170-4 together with an "Other" icon 170-n, the latter to enable odd size envelopes to be programmed. By touching one of the icons 170-1, 170-3, 170-4, or 170-n, an envelope size other than the default envelope size (represented by icon 170-2) is programmed.

Similarly, and referring to FIG. 10, where envelope stock other than white (the default setting) is desired, "Envelope Stock" icon 171 of Basic scorecard 152-2 is highlighted to display various envelope stock choice icons 172-1, 172-2, 172-3, 172-4, 172-5 and "Other" icon 172-n. Touching one of the icons 172-2, 172-3, 172-4, 172-5, or 172-n programs a different envelope stock.

To change the default programming settings for the images (i.e., addresses, stamp, etc.) to be printed on envelopes 160, Special scorecard 152-3 is selected and displayed on the left side of screen 62.

Referring to FIGS. 7 and 11, to facilitate programming of envelope printing jobs, there is provided an "Envelope Template" selection icon 174 which may be selected anytime during programming of an envelope job. Selection of icon 174 displays on screen 62 in place of envelope Job Ticket 150 an Operator Envelope Template 160-1 with Sender Address, Return Address, Bar Code, Logo and Electronic Stamp fields 178, 180, 182, 184, 186, respectively. As used herein, "Sender Address" refers to the addressee to whom the envelope is addressed, while "Return Address" refers to the addressor who is mailing the envelope and its contents. In the example shown, Sender Address field 178 is variable while Return Address, Bar Code, Logo, and Electronic Stamp fields 180, 182, 184, 186, respectively, are fixed. Also displayed is a Sample Envelope Template 160-2 which depicts an envelope 160 with the Sender Address, Return Address, Bar Code, Logo, and Electronic Stamp having fields filled in with examples of sender address 198, return address 220, bar code 240, logo 234, and stamp 258 following programming selections made by the operator.

As will be understood, the number of fields may be varied to reduce or increase the number of items provided for. Further, some or all of the fields may be fixed or variable, the later permitting the location and/or size of the field and therefore the image data in the field to be varied.

Referring particularly to FIGS. 7 and 12–14, to select Sender Addresses, "Sender Address" icon 190 on Job Ticket 150 is actuated from "off" to "on". This displays the Sender Address default setting (i.e., "Sender Address Directory-Group #2), which will be printed unless a different group of Sender addresses is selected. To view the Sender Addresses 198 in the default "Group #2" or to change to a different file or group of Sender Addresses, "Sender Address Directory" icon 190 is highlighted. As shown in FIG. 12, this displays a Sender Address Directory 192 together with any other groups 194 of sender addresses in the directory on screen 62, with the default group selection (i.e., "Group #2") highlighted to visually indicate the current programming selection. Actuating a different Sender Address Group reprograms the sender addresses from the preselected default group originally programmed to the newly selected sender address group. At the same time, the newly selected address group is highlighted on screen 64 to show the new programming choice.

Each sender address group or list 194 comprises a list of sender names and addresses (i.e., street and number, city or town, state, and zip code). The specific sender names, the number of names, the arrangement of the names in each group 194, etc., may vary as will be understood. For example, a group 194 may contain sender addresses arranged alphabetically, or by zip code, or by profession (i.e., doctors, lawyers), or in any other manner desired by the operator or user.

To display the Sender Addresses in the group selected (i.e., "Group #2"), the sender address group that is highlighted on screen 62 (i.e., Sender Address Group #2) is actuated (SELECT SENDER ADDRESS GROUP). As shown in FIG. 13, this opens the selected group and displays the sender addresses 198 in the group. Up and down scrolling icons 200, 202 enable the sender addresses 198 to be scrolled for viewing by the operator where the number of addresses in the group selected is greater than the display area provided.

An envelope print mimic 160-3, similar to the envelope template 160-1 of FIG. 11, is also displayed on touchscreen 62 whenever sender address directory or a sender address group is accessed. Envelope mimic 160-3 is on one side of sender address directory 192 (FIG. 12) or sender address group 194 (FIG. 13), mimic 160-3 having Sender Address, Return Address, Bar Code, Logo, and Electronic Stamp fields 178, 180, 182, 184, 186, respectively displayed.

Sender Address field 178, which depicts the relative size of the sender address and the position where the sender address will be printed on each envelope, is highlighted to indicate that programming of sender addresses is taking place. A scale of numbers extending along one side (i.e., along the Y axis) and along the bottom (i.e., along the X axis) of mimic 160-3 shows the relative size and orientation of the addresses 198 that will be printed on the envelopes.

In the example shown, Sender Address field 178 is variable to enable the operator to adjust the position where the sender addresses 198 will be printed on envelopes 160 (CHANGE ADDRESS LOCATION). X direction and Y direction scrolling icons 204, 206 respectively are used for this purpose. By selective actuation of scrolling icons 204, 206 (USE ARROW BUTTONS TO MOVE ADDRESS), the Sender Address field 178 can be moved in the X and/or Y directions to adjust the location of the address field and the position of the addresses 198 printed on the envelopes 160. Numerical displays 208, 210 show the X and Y positions of the address relative to the envelope.

Where desired, the addresses in the group of sender addresses selected may be changed or edited for the particular envelope print job. To temporarily erase certain addresses (ERASE ADDRESS) for the particular envelope print job being programmed, the address or addresses to be erased are highlighted and ERASE button 212 (SELECT ERASE BUTTON) actuated. New sender addresses (SELECT NEW ADDRESS) may be input via keyboard 64 or replacement addresses from another sender address group (SELECT REPLACE ADDRESS FROM MENU) may also be made.

When the sender address selections are completed, the sender address group 194 and sender address directory 192 may be closed (CLOSE SENDER ADDRESS GROUP) (CLOSE SENDER ADDRESS DIRECTORY) by touching CLOSE button 214.

The minimum number of envelopes 160 to be printed in any run is equal to the number of different sender addresses in the group selected. Accordingly, selecting a sender address group normally programs number of envelopes printed. Where plural sets of envelopes are desired—a set being one printing of envelopes in a sender address group—"Quantity" selection icon 162 of Job Level scorecard 152-1 is used to program the number of sets. And, in cases where a single sender address is repeatedly printed on all envelopes as in the case where envelopes for return mailings are being printed, the number of envelopes to be printed is programmed using "Quantity" selection icon 162.

Referring now to FIGS. 7, 11, and 15-17, to print return addresses, the "Return Address" icon 216 of Job Ticket 150 (or of Special scorecard 152-3) is actuated to the "on" condition. This displays on screen 62 the default Return Address "Xerox Standard" which will be printed unless a different return address is selected. To change the return address, the "Return Address" icon 216 is touched. This displays a Return Address Directory 218 with a list of Return Address Subdirectories or files 219 stored therein. An example is shown in FIG. 15 wherein the preselected default subdirectory is highlighted. To change to another Return Address Subdirectory 219, the desired subdirectory is actuated.

By actuating a Return Address Subdirectory such as the highlighted default Return Address Subdirectory, a list of Return Address 220 stored in that particular subdirectory is displayed (FIG. 16), with the Return Address currently programmed (i.e., "Xerox Standard") highlighted. Up and Down scrolling icons 200, 202 enable the list of Return Addresses in the subdirectory to be scrolled for viewing by the operator as necessary.

Highlighting a different Return Address 220 in the subdirectory 219 displayed on screen 62 programs that Return Address 220. Closing the display programs the new Return Address selected.

Return addresses 220 typically comprise the sender's name, street, city or town, state, and zip code. The return address field 180 on envelope print mimic 196 displayed on touchscreen 62 is highlighted to indicate that programming of the return address is taking place.

Instead of selecting a pre-stored return address from return address directory 218, the return address may be entered through keyboard 64.

While a Return Address Directory having plural Return Address Subdirectories 219 therein is disclosed, it will be understood that only a single Address Directory may be used. In that case, the Return Address Directory would contain one or more return addresses for programming selection.

An envelope mimic 160-3 is displayed alongside the Return Address Directory and Subdirectory displays of FIGS. 16 and 17 having the Sender Address, Return Address, Bar Code, Logo, and Electronic Stamp fields 178, 180, 182, 184, 186 respectively displayed with the Return Address field 180 highlighted to indicate that programming of the return address is taking place. In the example shown, return address field 180 is fixed. It will be understood, however, that return address field 180 may be variable in which case X and Y number scales and X and Y scrolling icons would be provided as in the case of the aforementioned sender address mimic to enable the return address field 180 to be moved to change the location where the return address 220 is printed on envelopes 160.

Referring particularly to FIGS. 7, 11 and 18, bar codes 240 may also be programmed for printing in the same manner as are sender addresses described above. Bar codes are typically used to facilitate automatic sorting of envelopes by the postal service, the bar code representing a discrete geographical Zip Code destination associated with the envelope's addressee. Bar codes may be used to represent other information as well.

Where it is desired to print a bar code 240 on envelopes 160, "Bar Code" icon 242 is actuated from "off" to "on". This programs the default bar code selection (seen in FIGS. 11 and 18) for printing. Where it is desired to change to a different bar code 240, a "Bar Code Directory" icon 244 is actuated to display a Bar Code Directory or file (not shown) on screen 62 containing a list of the bar codes 240 available for selection, together with envelope mimic icon 160-3 of the type shown in either FIGS. 12 and 13 (where the bar code field 182 is variable) or in FIGS. 15 and 16 (where the bar code field is fixed) depicting the relative size and position of the bar code 240 on envelopes 160. Where it is desired to change to another bar code, the desired bar code from the list displayed on screen 62 is selected. And as will be understood, where there is more than one Bar Code Directory, a different Bar Code Directory may be opened to display the bar code program choices therein. Alternately, a special bar code may be created for the job.

Logos 234 for printing on envelopes 160 are stored in a merge library of the type described in copending U.S. Patent Application No. 590,633, filed Sep. 28, 1990, to Acco Hengst et al, and entitled "Process For Merging Merge Items With Prints Produced By Electronic Printing Machines", the disclosure of which is herein incorporated by reference. Where it is desired to print a logo on the envelopes, "Merge" icon 250 is actuated from an "off" condition to "on". This programs the default Logo (seen in FIG. 18) for printing. As in the case of bar code programming described above, where it is desired to change to a different logo, "Merge Library Directory" icon 254 is actuated to open the merge library directory or file (not shown) in which various Logo selections including the default Logo are stored together with an envelope mimic such as shown in FIGS. 12 and 13 or FIGS. 15 and 16 displaying the Logo field 184 to indicate where Logo 234 will be printed on envelopes 160. Logo field 184 is highlighted to indicate that programming of the Logo is taking place. Actuating a different Logo selection programs that Logo for printing on envelopes 160. Where there is more than one library of Logos, other libraries are selected for display in the manner described. Alternately, a special Logo may be created for the job.

Address directories/subdirectories such as sender address directory 192, may have a bar code and/or logo associated with one or more addresses such that on selecting a particular sender or return address from a directory or subdirectory, a preselected bar code and/or logo will automatically be programmed for printing in bar code and/or logo fields 182, 184 respectively. Alternately, a specified bar code may be associated with a directory list such that the code will print automatically on every envelope until the directory list is exhausted. Further, a bar code may instead be identified in the merge library and assigned to be printed with a selected Logo or vice versa.

The envelope print job may also include printing of postage stamp 258 on envelopes 160. Postage stamp 258 may simply comprise a reproduction of an approved postage meter with postal rate or a Logo with picture and postage rate (an example is shown in FIG. 18). The postal rate normally comprises a standard or bulk rate for certain size envelopes as set by the post office. Alternately, the system may manage matching of bulk postal rate to the size of the envelopes being printed. A plurality of different type and design postage stamp logos and/or postage rates may be provided in one or more Postage Stamp Directories or Subdirectories (not shown) for access and programming.

To program system 2 to print postage stamp 258, "Stamp" icon 260 on scorecard 152-3 is actuated from the "off" condition to "on". This programs the default postage stamp (shown in FIG. 18) for printing on envelopes 160 in stamp field 186 and displays the default stamp logo and rate(i.e., "Bulk 22").

Where it is desired to change the default postage stamp selection, icon 264 is actuated to display a Stamp Subdirectory or file (not shown) in which the default postage stamp selection is stored in the manner explained heretofore in connection .with sender address selection, return address selection, etc. Where there is more than one Stamp Subdirectory, the default Stamp Subdirectory is highlighted. By actuating the directory, a list of the various stamp selections in the directory is displayed on screen 62 with the default stamp selection highlighted. At the same time, an envelope mimic such as shown in FIGS. 12 and 13 or FIGS. 15 and 16 may be displayed in work area 155, showing the stamp field 186 highlighted and depicting the location where the stamp will be printed on the envelopes. Actuating a different stamp selection programs the new stamp selection for printing on envelopes 160 in place of the default stamp selection.

Following completion of the programming selections, CLOSE button 156 (FIG. 7) is actuated to close the envelope Job Ticket. Actuating "Start/Print" button 158 transfers the envelope print job to a print queue (not shown) for printing by printer section 8 of system 2.

Envelope print items such as Sender Address, Return Address, Bar Codes, Merge Items, Stamps, etc. may be derived by scanning in documents having the desired envelope print items thereon, or through input by keyboard 64, or through input from a remote source via net 5, streaming tape, etc. Where scanned in, the document containing the envelope print item(s) is placed on platen 20 by operating ADH 35 in one of the document handling modes described. The document is scanned to convert the envelope print item(s) to image signals. Since envelope print items such as sender addresses 198, return address 220, etc. are typically smaller than a standard image, editing may be required to remove extraneous image matter and to set the size and orientation of the item. For a more detailed discussion of editing items for printing, reference may be made to the aforecited .Acco Hengst et al application.

It will be understood that the order in which the programming steps for programming system 2 for an envelope printing job is exemplary only and that the order in which the job is programmed may be carried out in a different sequence from that described and shown. Further, while certain of the fields 178, 180, 182, 184, 186 are shown and described as being movable or fixed, various other combinations of fixed and movable fields or arrangements in which all of the fields are fixed or movable may be contemplated.

While the invention has been described with reference to the structure disclosed, it is not confined to the details set forth, but is intended to cover such modifications or changes as may come within the scope of the following claims.

I claim:

1. A method for processing envelopes in an electronic printing system having a printer for making prints on print media such as envelopes from image signals, memory means for storing the image signals for use by said printer in making prints, programming means including an interactive screen for programming said system to produce prints, a source of envelope print media, and envelope print media feeding means for feeding print media in succession to said printer for printing, comprising the steps of:

a) displaying an envelope job ticket on said interactive screen having preselected default envelope programming selections including a preselected default sender address programming selection and a preselected default return address programming selection for programming an envelope printing job;

b) providing a sender address directory in said memory having plural sender address files containing discrete sender addresses for programming selection;

c) providing at least one return address file having plural return addresses for programming selection;

d) accessing said sender address directory in said memory to display on said interactive screen said sender address files;

e) visually identifying said preselected default sender address file on said interactive screen;

f) using said interactive screen, selecting a new sender address file from said sender address files;

g) visually identifying said new sender address file programming selection on said interactive screen in place of said default sender address file programming selection in response to selection of said new sender address file;

h) displaying said envelope job ticket with a preselected default postage stamp programming selection;

i) providing a postage stamp file in said memory having plural postage stamp programming selections, each of said postage stamp programming selections corresponding with a postal rate for an envelope upon which the postage stamp of said postage stamp programming selection is to be printed, said providing step including:

programming a plurality of envelope types to be printed with said electronic printing system, and developing said postage stamp programming selections with said programmed plurality of envelope types so that each postage stamp programming selection corresponds with one of said programmed plurality of envelope types;

j) accessing said postage stamp file in said memory to display on said interactive screen said postage stamp programming selections; and k) selecting one of said postage stamp programming selections, with said interactive screen, from a selected one of said postage stamp programming selections displayed on said interactive screen to replace said preselected default postage stamp programming selection, the selected one of said postage stamp programming selections corresponding with the postal rate of each of the envelopes to be printed.

2. The method according to claim 1 including the steps of:

a) accessing said return address file to display said return addresses on said interactive screen;

b) visually identifying said preselected default return address on said interactive screen;

c) using said interactive screen, selecting a new return address from said return addresses displayed on said interactive screen; and d) visually identifying said new return address programming selection in place of said preselected default return address programming selection in response to selection of said new return address.

3. The method according to claim 1 including the steps of:

a) displaying said envelope job ticket with a preselected bar code programming selection;

b) providing a bar code file in said memory having plural bar code programming selections;

c) accessing said bar code file in said memory to display on said interactive screen said plural bar code programming selections;

d) visually identifying said default bar code programming selection on said interactive screen;

e) using said interactive screen, selecting a new bar code programming selection from said bar code programming selections displayed on said interactive screen; and f) visually identifying said different bar code programming selection in place of said preselected default bar code programming selection.

4. The method according to claim 1 including the steps of:

a) displaying said envelope job ticket with a preselected logo programming selection;

b) providing a logo file in said memory having plural logo programming selections;

c) accessing said logo file in said memory to display on said interactive screen said plural logo programming selections;

d) visually identifying said default logo programming selection on said interactive screen;

e) using said interactive screen, selecting a new logo from said logos displayed on said interactive screen; and f) visually identifying said new logo programming selection in place of said preselected default logo programming selection.

5. The method according to claim 1 including steps of:

a) providing a preselected default envelope print media programming selection;

b) accessing said envelope print media programming selections in said memory to display on said interactive screen said envelope print media selections;

c) visually identifying said default envelope print media selection on said interactive screen;

d) using said interactive screen, selecting a new envelope print media selection from said envelope print media selections displayed on said interactive screen; and e) visually identifying said new envelope print media programming selection on said interactive screen in place of said preselected default envelope print media selection.

6. The method according to claim 1 including the step of:

displaying an envelope mimic on said interactive screen having sender address and return address fields depicting the relative position at which said sender addresses and said return address will be printed on envelopes by said printer.

7. The method according to claim 6 including the step of:

using said interactive screen, repositioning said sender address field in said envelope mimic on said interactive screen to reprogram the position where said sender addresses will be printed on envelopes by said printer.

8. The method according to claim 6 including the step of:

using said interactive screen, repositioning said return address field in said envelope mimic on said interactive screen to reprogram the position where said return address will be printed on envelopes by said printer.

9. The method according to claim 6 including the step of:

using said interactive screen, repositioning said sender address field and return address field in said envelope mimic on said interactive screen to reprogram the position where said sender addresses and said return address will be printed on envelopes by said printer.

10. A method for processing envelopes in an electronic printing system having a printer for making prints on print media such as envelopes from image signals, memory means for storing the image signals for use by said printer in making prints, programming means including an interactive screen for programming said system to produce prints, a source of envelope print media, and envelope print media feeding means for feeding print media in succession to said printer for printing, comprising the steps of:

a) displaying an envelope job ticket on said interactive screen having preselected default envelope programming selections including a preselected default sender address programming selection and a preselected default return address programming selection for programming an envelope printing job;

b) providing at least one sender address file having plural sender addresses for programming selection;

c) accessing said sender address file in said memory to display on said interactive screen said sender addresses;

d) visually identifying said preselected default sender address on said interactive screen;

e) using said interactive screen, selecting a new sender address file from said sender addresses;

f) visually identifying said new sender address programming selection on said interactive screen in place of said default sender address programming selection in response to selection of said new sender address;

g) displaying said envelope job ticket with a preselected default postage stamp programming selection;

h) providing a postage stamp file in said memory having plural postage stamp programming selections, each of said postage stamp programming selections corresponding with a postal rate for an envelope upon which the postage stamp of said postage stamp programming selection is to be printed, said providing step including:

programming a plurality of envelope types to be printed with said electronic printing system, and developing said postage stamp programming selections with said programmed plurality of envelope types so that each postage stamp programming selection corresponds with one of said programmed plurality of envelope types;

i) accessing said postage stamp file in said memory to display on said interactive screen said postage stamp programming selections; and j) selecting one of said postage stamp programming selections, with said interactive screen, from a selected one of said postage stamp programming selections displayed on said interactive screen to replace said preselected default postage stamp programming selection, the selected one of said postage stamp programming selections corresponding with the postal rate of each of the envelopes to be printed.

11. The method according to claim 10 including the steps of:

a) displaying said envelope job ticket with a preselected bar code programming selection;

b) providing a bar code file in said memory having plural bar code programming selections;

c) accessing said bar code file in said memory to display on said interactive screen said plural bar code programming selections;

d) highlighting said default bar code programming selection on said interactive screen;

e) using said interactive screen, selecting a new bar code programming selection from said bar code programming selections displayed on said interactive screen; and f) visually identifying said different bar code programming selection in place of said preselected default bar code programming selection.

12. The method according to claim 11 including the steps of:

a) displaying said envelope job ticket with a preselected logo programming selection;

b) providing a logo file in said memory having plural logo programming selections;

c) accessing said logo file in said memory to display on said interactive screen said plural logo programming selections;

d) visually identifying said default logo programming selection on said interactive screen;

e) using said interactive screen, selecting a new logo from said logos displayed on said interactive screen; and f) visually identifying said new logo programming selection in place of said preselected default logo programming selection.

13. The method according to claim 10 including steps of:

a) providing a preselected default envelope print media programming selection;

b) accessing said envelope print media programming selections in said memory to display on said interactive screen said envelope print media selections;

c) visually identifying said default envelope print media selection on said interactive screen;

d) using said interactive screen, selecting a new envelope print media selection from said envelope print media selections displayed on said interactive screen; and e) visually identifying said new envelope print media programming selection on said interactive screen in place of said preselected default envelope print media selection.

14. The method according to claim 10 including the step of:

displaying an envelope mimic on said interactive screen having a sender address field depicting the relative position at which said sender address will be printed on envelopes by said printer.

15. The method according to claim 14 including the step of:

using said interactive screen, repositioning said sender address field in said envelope mimic on said interactive screen to reprogram the position where said sender address will be printed on envelopes by said printer.

16. A method for processing envelopes in an electronic printing system having a printer for making prints on print media such as envelopes from image signals, memory means for storing the image signals for use by said printer in relating prints, programming means including an interactive screen for programming said system to produce prints, a source of envelope print media, and envelope print media feeding means for feeding print media in succession to said printer for printing, comprising the steps of:

a) displaying an envelope job ticket on said interactive screen having preselected default envelope programming selections including a preselected default sender address programming selection and a preselected default return address programming selection for programming an envelope printing job;

b) providing a sender address directory in said memory having plural sender address files containing discrete sender addresses for programming selection;

c) providing at least one return address file having plural return addresses for programming selection;

d) accessing said return address file to display said return addresses on said interactive screen;

e) visually identifying said preselected default return address on said interactive screen;

f) using said interactive screen, selecting a new return address from said return addresses displayed on said interactive screen;

g) visually identifying said new return address programming selection in place of said preselected default return address programming selection in response to selection of said new return address h) displaying said envelope job ticket with a preselected default postage stamp programming selection;

i) providing a postage stamp file in said memory having plural postage stamp programming selections, each of said postage stamp programming selections corresponding with a postal rate for an envelope upon which the postage stamp of said postage stamp programming selection is to be printed, said providing step including:

programming a plurality of envelope types to be printed with said electronic printing system, and developing said postage stamp programming selections with said programmed plurality of envelope types so that each postage stamp programming selection corresponds with one of said programmed plurality of envelope types;

j) accessing said postage stamp file in said memory to display on said interactive screen said postage stamp programming selections; and k) selecting one of said postage stamp programming selections, with said interactive screen, from a selected one of said postage stamp programming selections displayed on said interactive screen to replace said preselected default postage stamp programming selection, the selected one of said postage stamp programming selections corresponding with the postal rate of each of the envelopes to be printed.

17. The method according to claim 16 including steps of:

a) providing a preselected default envelope print media programming selection;

b) accessing said envelope print media programming selections in said memory to display on said interactive screen said envelope print media selections;

c) visually identifying said default envelope print media selection on said interactive screen;

d) using said interactive screen, selecting a new envelope print media selection from said envelope print media selections displayed on said interactive screen; and e) visually identifying said new envelope print media programming selection on said interactive screen in place of said preselected default envelope print media selection.

18. The method according to claim 16 including the step of:

displaying an envelope mimic on said interactive screen having sender address and return address fields depicting the relative position at which said sender addresses and said return address will be printed on envelopes by said printer.

19. The method according to claim 18 including the step of:

using said interactive screen, repositioning said return address field in said envelope mimic on said interactive screen to reprogram the position where said return address will be printed on envelopes by said printer.

20. The method according to claim 18 including the step of:

using said interactive screen, repositioning said sender address field in said envelope mimic on said interactive screen to reprogram the position where said sender addresses will be printed on envelopes by said printer.

21. The method according to claim 18 including the step of:

using said interactive screen, repositioning said sender address field and return address field in said envelope mimic on said interactive screen to reprogram the position where said sender addresses and said return address will be printed on envelopes by said printer.

* * * * *